(12) United States Patent
Miyasaka et al.

(10) Patent No.: US 10,891,891 B2
(45) Date of Patent: Jan. 12, 2021

(54) ELECTRO-OPTICAL DEVICE AND ELECTRONIC APPARATUS

(71) Applicant: SEIKO EPSON CORPORATION, Tokyo (JP)

(72) Inventors: Mitsutoshi Miyasaka, Suwa (JP); Yoichi Momose, Matsumoto (JP); Kiyoshi Sekijima, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/260,195

(22) Filed: Jan. 29, 2019

(65) Prior Publication Data

US 2019/0235250 A1 Aug. 1, 2019

(30) Foreign Application Priority Data

Jan. 30, 2018 (JP) ................................. 2018-013830

(51) Int. Cl.
*G09G 3/3233* (2016.01)
*G09G 3/20* (2006.01)
(Continued)

(52) U.S. Cl.
CPC ....... *G09G 3/2022* (2013.01); *G02B 27/0172* (2013.01); *G09G 3/3233* (2013.01);
(Continued)

(58) Field of Classification Search
CPC ........ G02B 27/0172; G02B 2027/0178; G02B 17/0856; G09G 2300/0426;
(Continued)

(56) References Cited

U.S. PATENT DOCUMENTS

2002/0047839 A1 4/2002 Kasai
2002/0070913 A1 6/2002 Kimura et al.
(Continued)

FOREIGN PATENT DOCUMENTS

JP 2002-169510 A 6/2002
JP 2002-287695 A 10/2002
(Continued)

OTHER PUBLICATIONS

Notice of Reasons for Refusal, Application number: Japanese Patent Application No. 2018-013830, Date of Drafting: Reiwa 1 dated Jul. 2, 2019. (Year: 2019).*

*Primary Examiner* — Julie Anne Watko
(74) *Attorney, Agent, or Firm* — Oliff PLC

(57) ABSTRACT

An electro-optical device includes a scan line, a data line, a pixel circuit, and an enable line. The pixel circuit includes a memory circuit, a light emitting element, and a first transistor. The light emitting element changes brightness in response to an image signal held in the memory circuit. The first transistor controls light emission and non-light-emission of the light emitting element. A field for displaying a single image each includes a sub-field (SF1) and a sub-field (SF2). The sub-field (SF1) and the sub-field (SF2) include a non-display period during which the light emitting element does not emit light and a display period during which the light emitting element is allowed to emit light. A length of the display period in the sub-field (SF1) is different from a length of the display period in the sub-field (SF2).

12 Claims, 17 Drawing Sheets

(51) Int. Cl.
  *G02B 27/01* (2006.01)
  *G09G 3/3266* (2016.01)
  *G09G 3/3258* (2016.01)
  *G09G 3/3291* (2016.01)
  *G09G 3/3225* (2016.01)

(52) U.S. Cl.
  CPC ......... *G09G 3/3258* (2013.01); *G09G 3/3266* (2013.01); *G09G 3/3291* (2013.01); *G02B 2027/0178* (2013.01); *G09G 2300/0426* (2013.01); *G09G 2300/0452* (2013.01); *G09G 2300/0857* (2013.01); *G09G 2300/0861* (2013.01); *G09G 2310/0286* (2013.01); *G09G 2310/08* (2013.01); *G09G 2320/0233* (2013.01)

(58) Field of Classification Search
  CPC ... G09G 2300/0452; G09G 2310/0286; G09G 2310/08; G09G 2320/0233; G09G 3/3233; G09G 3/3266; G09G 3/3291; G09G 2310/0262; G09G 2300/0857; G09G 2300/0861; G09G 2300/0819; G09G 3/2022; G09G 17/0856; G09G 3/3258; G09G 3/2074
  See application file for complete search history.

(56) References Cited

U.S. PATENT DOCUMENTS

| | | | | |
|---|---|---|---|---|
| 2002/0093472 A1* | 7/2002 | Numao | ............... | G09G 3/3258 345/87 |
| 2002/0140642 A1 | 10/2002 | Okamoto | | |
| 2004/0056605 A1 | 3/2004 | Yoshida | | |
| 2004/0233143 A1 | 11/2004 | Kasai | | |
| 2005/0231450 A1* | 10/2005 | Takai | ................... | G09G 3/2014 345/77 |
| 2005/0259121 A1* | 11/2005 | Miyagawa | ........... | G09G 3/3233 345/690 |
| 2006/0044229 A1* | 3/2006 | Yamazaki | ........... | G09G 3/2022 345/76 |
| 2007/0159417 A1 | 7/2007 | Miyake | | |
| 2013/0328753 A1 | 12/2013 | Tsuge | | |
| 2015/0302795 A1* | 10/2015 | Genoe | ................. | G09G 3/3233 345/691 |
| 2016/0163257 A1* | 6/2016 | Jang | ..................... | G09G 3/3225 345/76 |
| 2017/0345376 A1* | 11/2017 | Tani | ..................... | G09G 3/3233 |

FOREIGN PATENT DOCUMENTS

| | | |
|---|---|---|
| JP | 2002287718 A * | 10/2002 |
| JP | 2002-341821 A | 11/2002 |
| JP | 2004-062199 A | 2/2004 |
| JP | 2004-117648 A | 4/2004 |
| JP | 2004-163601 A | 6/2004 |
| JP | 2005-301174 A | 10/2005 |
| JP | 2007-206681 A | 8/2007 |
| JP | 2016-500850 A | 1/2016 |
| WO | 2013/021622 A1 | 2/2013 |

* cited by examiner

| THE NUMBER OF ROWS M | 720 |
|---|---|
| THE NUMBER OF COLUMNS N | 3840 |
| THE NUMBER OF PIXELS M × N | 2764800 |
| FRAME FREQUENCY f | 60 Hz |
| 1 FRAME PERIOD 1/f | 16.67 msec |
| ONE SCAN LINE SELECTION PERIOD x | 0.5 μsec |
| ONE VERTICAL PERIOD VP = x × M | 0.36 msec |
| BIT NUMBER g OF GRAY SCALES | 16 bit |

| | | | | SF1 PERIOD IN TOTAL | 0.36 msec |
|---|---|---|---|---|---|
| NON-DISPLAY PERIOD P1-1 IN SF1 | 0.3598 msec | DISPLAY PERIOD P2-1 IN SF1 | 0.0002 msec | SF1 PERIOD IN TOTAL | 0.36 msec |
| NON-DISPLAY PERIOD P1-2 IN SF2 | 0.3596 msec | DISPLAY PERIOD P2-2 IN SF2 | 0.0004 msec | SF2 PERIOD IN TOTAL | 0.36 msec |
| NON-DISPLAY PERIOD P1-3 IN SF3 | 0.3592 msec | DISPLAY PERIOD P2-3 IN SF3 | 0.0008 msec | SF3 PERIOD IN TOTAL | 0.36 msec |
| NON-DISPLAY PERIOD P1-4 IN SF4 | 0.3584 msec | DISPLAY PERIOD P2-4 IN SF4 | 0.0016 msec | SF4 PERIOD IN TOTAL | 0.36 msec |
| NON-DISPLAY PERIOD P1-5 IN SF5 | 0.3568 msec | DISPLAY PERIOD P2-5 IN SF5 | 0.0032 msec | SF5 PERIOD IN TOTAL | 0.36 msec |
| NON-DISPLAY PERIOD P1-6 IN SF6 | 0.3536 msec | DISPLAY PERIOD P2-6 IN SF6 | 0.0064 msec | SF6 PERIOD IN TOTAL | 0.36 msec |
| NON-DISPLAY PERIOD P1-7 IN SF7 | 0.3472 msec | DISPLAY PERIOD P2-7 IN SF7 | 0.0128 msec | SF7 PERIOD IN TOTAL | 0.36 msec |
| NON-DISPLAY PERIOD P1-8 IN SF8 | 0.3344 msec | DISPLAY PERIOD P2-8 IN SF8 | 0.0256 msec | SF8 PERIOD IN TOTAL | 0.36 msec |
| NON-DISPLAY PERIOD P1-9 IN SF9 | 0.3088 msec | DISPLAY PERIOD P2-9 IN SF9 | 0.0512 msec | SF9 PERIOD IN TOTAL | 0.36 msec |
| NON-DISPLAY PERIOD P1-10 IN SF10 | 0.2575 msec | DISPLAY PERIOD P2-10 IN SF10 | 0.1025 msec | SF10 PERIOD IN TOTAL | 0.36 msec |
| NON-DISPLAY PERIOD P1-11 IN SF11 | 0.1551 msec | DISPLAY PERIOD P2-11 IN SF11 | 0.2049 msec | SF11 PERIOD IN TOTAL | 0.36 msec |
| NON-DISPLAY PERIOD P1-12 IN SF12 | 0.0005 msec | DISPLAY PERIOD P2-12 IN SF12 | 0.4098 msec | SF12 PERIOD IN TOTAL | 0.41 msec |
| NON-DISPLAY PERIOD P1-13 IN SF13 | 0.0005 msec | DISPLAY PERIOD P2-13 IN SF13 | 0.8196 msec | SF13 PERIOD IN TOTAL | 0.82 msec |
| NON-DISPLAY PERIOD P1-14 IN SF14 | 0.0005 msec | DISPLAY PERIOD P2-14 IN SF14 | 1.6392 msec | SF14 PERIOD IN TOTAL | 1.64 msec |
| NON-DISPLAY PERIOD P1-15 IN SF15 | 0.0005 msec | DISPLAY PERIOD P2-15 IN SF15 | 3.2784 msec | SF15 PERIOD IN TOTAL | 3.28 msec |
| NON-DISPLAY PERIOD P1-16 IN SF16 | 0.0005 msec | DISPLAY PERIOD P2-16 IN SF16 | 6.5569 msec | SF16 PERIOD IN TOTAL | 6.56 msec |
| TOTAL NON LIGHT EMISSION PERIOD | 3.553 msec | TOTAL EMITTABLE PERIOD | 13.114 msec | TOTAL | 16.67 msec |

| THE NUMBER OF DISPLAY GRAY SCALES | 65536 GRAY SCALES |
|---|---|
| THE TOTAL NUMBER OF EMISSION COLORS | 281474976710656 COLORS |

Fig. 8

ELECTRO-OPTICAL DEVICE AND ELECTRONIC APPARATUS

BACKGROUND

1. Technical Field

The invention relates to an electro-optical device and an electronic apparatus.

2. Related Art

In recent years, head-mounted displays (HMDs), a type of electronic apparatus that enables formation and viewing of a virtual image by directing image light from an electro-optical device to the pupil of an observer, have been proposed. One example of the electro-optical device used in these electronic apparatus is an organic electro-luminescence (EL) device that includes an organic EL element as a light-emitting element. The organic EL devices used in head-mounted displays are required to provide high resolution, fine pixels, multiple gray scales of display, and low power consumption.

In known organic EL devices, when a selecting transistor turns to an ON-state according to a scan signal supplied to a scan line, an electrical potential based on an image signal supplied from a data line is held in a capacitive element electrically connected to the gate of a driving transistor. When the driving transistor turns to an ON-state in response to the electrical potential held in the capacitive element, that is, the gate potential of the driving transistor, an electric current flows through the organic EL element depending on the gate potential of the driving transistor and thus the organic EL element emits light with luminance depending on the electric current.

In this way, the known organic EL device performs a gray-scale display using analog driving that controls the current flowing through the organic EL element depending on the gate potential of the driving transistor. This causes problems of variation in brightness and gray scale shift among pixels because of variation in current-voltage characteristics and threshold voltage of the driving transistor, and thus reduces display quality. In contrast, an organic EL device that includes a memory circuit in which inverters formed of a P-type transistor and an N-type transistor are electrically connected in a circular fashion to each other for each pixel and performs display by digital driving, namely, a memory integrated type display element has been proposed (for example, see JP-A-2002-287695).

According to the configuration of the organic EL device described in JP-A-2002-287695, a potential of output of the memory circuit electrically connected to a light emitting element is one of binary values of High as a reference potential for causing the light emitting element to emit light or Low as a ground potential for causing the light emitting element not to emit light by a potential of a signal input during a selection period. For example, when the potential of the input of the memory circuit is Low in a pixel selected in a selection circuit, the potential of the output of the memory circuit is High. Accordingly, a path that leads from a power supply line that supplies the reference potential to a ground line as the ground potential through the P-type transistor and the light emitting element can be electrically conducted, and thus the light emitting element emits light. The signal input during the selection period is also held in the memory circuit during a non-selection period. A light emission state or a non-light-emissionon state of the light emitting element is maintained until a signal input in a next selection period is switched from Low to High or from High to Low.

However, in the organic EL device described in JP-A-2002-287695, the light emitting element starts or stops light emission in a period during which a signal is written to the memory circuit, so that it is difficult to strictly control a period during which the light emitting element is in the light emission and a period during which the light emitting element is in the non-light-emission. In other words, it is difficult to accurately express gray scales by time-division driving and achieve display in multiple gray scales, and thus it is difficult to improve image quality.

SUMMARY

The invention is made to solve at least a part of the problems above and can be achieved as aspects or application examples described below.

Application Example 1

An electro-optical device according to Application Example 1 includes a scan line, a data line, a pixel circuit located at a position corresponding to an intersection of the scan line and the data line, and an enable line. The pixel circuit includes a memory circuit, a light emitting element, and a control circuit. The light emitting element changes brightness in response to an image signal held in the memory circuit. The control circuit controls state of the light emitting element between a light emission state and non-light-emission state. A field, which displays a single image, includes a first sub-field and a second sub-field. The first sub-field includes a first period, during which the light emitting element does not emit light, and a second period during which the light emitting element is able to emit light. The second sub-field includes a third period, during which the light emitting element does not emit light, and a fourth period during which the light emitting element is allowed to emit light. A length of the second period is different from a length of the fourth period.

According to the configuration in Application Example 1, the pixel circuit includes the memory circuit, and thus gray-scale display can be performed by writing a digital signal expressed by binary values of ON and OFF to the memory circuit and controlling a ratio of light emission to non-light-emission of the light emitting element. The pixel circuit includes the control circuit that controls light emission and non-light-emission independently from the memory circuit. Thus, a period during which an image signal is written to the memory circuit and a period during which the light emitting element is in a state of being allowed to emit light can be controlled independently from each other. Therefore, in each pixel circuit, the light emitting element can be in the non-light-emissionon state in the period during which the image signal is written to the memory circuit. After the image signal is written to the memory circuit, the light emitting element can be in a state of being allowed to emit light with a predetermined period of time as a display period. Thus, accurate gray scales can be achieved by time-division driving. A single field displaying a single image includes a plurality of sub-fields, and the second period during which the light emitting element is allowed to emit in the first sub-field included in this single field and the fourth period during which the light emitting element is allowed to emit in the second sub-field included in this single field. And a length of the second period and a length of the fourth period are different each other. Therefore, periods during which the light emitting element is allowed to emit light can be set to vary in length by increasing the number of sub-fields, and thus multiple gray scales of a display can be easily achieved.

Application Example 2

An electro-optical device according to Application Example 2 includes a scan line, a data line, a pixel circuit located at a position corresponding to an intersection of the scan line and the data line, and an enable line. The pixel circuit includes a memory circuit, a light emitting element, and a control circuit. The light emitting element changes brightness in response to an image signal held in the memory circuit. The control circuit controls state of the light emitting element between a light emission state and non-light-emission state. A field, which displays a single image, includes a first sub-field and a second sub-field. The first sub-field includes a first period, during which the light emitting element does not emit light, and a second period during which the light emitting element is allowed to emit light. The second sub-field includes a third period, during which the light emitting element does not emit light, and a fourth period during which the light emitting element is allowed to emit light. A length of the first period is different from a length of the third period.

According to the configuration in Application Example 1, the pixel circuit includes the memory circuit, and thus gray-scale display can be performed by writing a digital signal expressed by binary values of ON and OFF to the memory circuit and controlling a ratio of light emission to non-light-emission of the light emitting element. The pixel circuit includes the control circuit that controls light emission and non-light-emission independently from the memory circuit. Thus, a period during which an image signal is written to the memory circuit and a period during which the light emitting element is in a state of being allowed to emit light can be controlled independently from each other. Therefore, in each pixel circuit, the light emitting element can be in the non-light-emission state in the period during which the image signal is written to the memory circuit. After the image signal is written to the memory circuit, the light emitting element can be in a state of being allowed to emit light with a predetermined period of time as a display period. Thus, accurate gray scales can be achieved by time-division driving. A single field which is displaying a single image includes a plurality of sub-fields, and the first period during which the light emitting element is in the non-light-emission in the first sub-field included in this single field and the third period during which the light emitting element is in the non-light-emission in the second sub-field included in this single field. And a length of the first period and a length of the third period are different each other. As a result, the length of light emission period in the first sub-field can be different from the length of light emission period in the second sub-field, and periods during which the light emitting element is allowed to emit light can be set to vary in length by increasing the number of sub-fields. Thus, multiple gray scales of a display can be easily achieved.

Application Example 3

An electro-optical device according to Application Example 3 includes a scan line, a data line, a pixel circuit located at a position corresponding to an intersection of the scan line and the data line, and an enable line. The pixel circuit includes a memory circuit, a light emitting element, and a control circuit. The light emitting element changes brightness in response to an image signal held in the memory circuit. The control circuit controls state of the light emitting element between a light emission and non-light-emission. A field, which displays a single image, includes a first sub-field and a second sub-field. The first sub-field includes a first period during which the light emitting element does not emit light and a second period during which the light emitting element is allowed to emit light. The second sub-field includes a third period, during which the light emitting element does not emit light, and a fourth period during which the light emitting element is allowed to emit light. A length of the first period is different from a length of the third period. A length of the second period is different from a length of the fourth period.

According to the configuration in Application Example 1, the pixel circuit includes the memory circuit, and thus gray-scale display can be performed by writing a digital signal expressed by binary values of ON and OFF to the memory circuit and controlling a ratio of light emission to non-light-emission of the light emitting element. The pixel circuit includes the control circuit that controls light emission and non-light-emission independently from the memory circuit. Thus, a period during which an image signal is written to the memory circuit and a period during which the light emitting element is in a state of being allowed to emit light can be controlled independently from each other. Therefore, in each pixel circuit, the light emitting element can be in the non-light-emission state in the period during which the image signal is written to the memory circuit. After the image signal is written to the memory circuit, the light emitting element can be in a state of being allowed to emit light with a predetermined period of time as a display period. Thus, accurate gray scales can be achieved by time-division driving. A single field which is displaying a single image includes a plurality of sub-fields that include a first sub-field and a second sub-field. The first sub-field includes a first period during which the light emitting element does not emit light and a second period during which the light emitting element is allowed to emit light. The second sub-field includes a third period, during which the light emitting element does not emit light, and a fourth period during which the light emitting element is allowed to emit light. A length of the second period is different from a length of the fourth period. As a result, the length of the second period can be different from the length of the second period, and periods during which the light emitting element is allowed to emit light can be set to vary in length by increasing the number of sub-fields. Thus, multiple gray scales of a display can be easily achieved.

Application Example 4

In the electro-optical device according to Application Example 4, the second period is preferably shorter than one vertical period from a first time, at which selection potential starts to be supplied to the scan line in the first sub-field, to a second time at which selection potential starts to be supplied to the scan line in a next sub-field subsequent to the first sub-field.

According to the configuration in Application Example 4, the length of the second period in the first sub-field is shorter than one vertical period within which selection of each of the plurality of scan lines is completed in the first sub-field. Thus, the number of display gray scales by time-division driving can be easily increased by setting the second period, during which the light emitting element is allowed to emit light, to be an extremely short time. In this way, a high-quality image can be achieved.

Application Example 5

In the electro-optical device according to Application Example 5, a sum of a length of the first period and a length of the second period is preferably equal to a sum of a length of the third period and a length of the fourth period.

According to the configuration in Application Example 5, a period length that is the sum of the length of the first period and the length of the second period in the first sub-field is equal to a period length that is the sum of the length of the third period and the length of the fourth period in the second sub-field. Thus, the period length in the second sub-field can be set as the one vertical period within which selection of each of the plurality of scan lines is completed in the first sub-field. Therefore, the number of display gray scales by time-division driving can be easily increased by setting the fourth period in the second sub-field to be an extremely short time. In this way, a high-quality image can be achieved.

Application Example 6

In the electro-optical device according to Application Example 6, the fourth period is preferably longer than one vertical period from a first time, at which selection potential starts to be supplied to the scan line in the first sub-field, to a second time at which selection potential starts to be supplied to the scan line in a next sub-field subsequent to the first sub-field.

According to the configuration in Application Example 6, the number of display gray scales by time-division driving can be easily increased by setting the second period in the first sub-field to be an extremely short time and the fourth period in the second sub-field to be a relatively long time. In this way, a high-quality image can be achieved.

Application Example 7

In the electro-optical device according to Application Example 7, the control circuit preferably controls state of the light emitting element between the light emission state and non-light-emission state in response to enable potentials supplied from the enable line, and the enable potentials preferably includes a inactive potential being supplied in the first period and causing the light emitting element not to emit light, and an active potential being supplied in the second period and allows the light emitting element to emit light.

According to the configuration in Application Example 7, the light emitting element is caused not to emit light when the non-active potentials is supplied from the enable line, and the light emitting element is allowed to emit light when the active potentials is supplied to the enable line. In this way, the first period, during which the image signal is written to the memory circuit, with the light emitting element not emitting light and the second period, during which the light emitting element is allowed to emit light, can be freely set.

Application Example 8

In the electro-optical device according to Application Example 8, a second pixel circuit that differ from the pixel circuit are preferably included, a second enable line corresponding to the second pixel circuit. A first time, at which the active potential starts to be supplied to the enable line, is different to be supplied to the enable line, is preferably different from a second time at which the active potential starts to be supplied to the second enable line starts.

According to the configuration in Application Example 8, the second enable line corresponding to the second pixel circuit are included. Thus, the active potential can be supplied to the enable line and the second enable line. Since the first time at which supply of the active potential to the enable line starts is different from the second time at which supply of the active potential to the second enable line starts, each of the enable lines can be successively scanned and turned into the active state without waiting the one vertical period within which selection of each of the plurality of scan lines is completed. Therefore, the enable line can be turned into the active state to allow the light emitting element to emit light upon the completion of the selection of the scan line for each pixel circuit. In other words, a period during which the light emitting element is in the non-light-emission can be shortened, and thus bright display can be achieved.

Application Example 9

In the electro-optical device according to Application Example 9, a second scan line corresponding to the second pixel circuit is preferably included. A scan signal supplied to the scan line and the second scan line include a selection potential and a non-selection potential, and a time difference between a third time, at which supply of the selection potential to the first scan line starts, and a fourth time, at which supply of the selection potential to the second scan line starts, is preferably equal to a time difference between the first time and the second time.

According to the configuration in Application Example 9, the time difference between the third time at which supply of the selection potential to the scan line corresponding to the pixel circuit starts and the fourth time at which supply of the selection potential to the second scan line corresponding to the second pixel circuit starts is equal to the time difference between the first time at which supply of the active potential to the enable line starts and the second time at which supply of the active potential to the second enable line starts. Therefore, a cycle in which the selection potential is supplied to the scan line can be identical to a cycle in which the active potential is supplied to the enable line. As a result, the enable line can be successively turned into the active state for each pixel circuit according to selection of the scan line, and the light emitting element is allowed to emit light upon the completion of the selection of the scan line.

Application Example 10

In the electro-optical device according to Application Example 10, the data line preferably extends in a first direction, and the scan line and the enable line preferably extend in a second direction intersecting the first direction.

According to the configuration in Application Example 10, the scan line and the enable line extend in the second direction. Thus, a pair of the scan line and the enable line can be arranged for each pixel circuit. In this way, the light emitting element is allowed to emit light upon the completion of the selection of the scan line.

Application Example 11

The electro-optical device according to Application Example 11 preferably includes a scan line drive circuit electrically connected to the scan line, and an enable line drive circuit electrically connected to the enable line.

According to the configuration in Application Example 11, the scan line drive circuit drives the scan line, and the enable line drive circuit drives the enable line. Thus, the scan line and the enable line can be easily driven independently from each other.

Application Example 12

The electro-optical device according to Application Example 12 preferably includes a data line drive circuit electrically connected to the data line, the data line drive circuit is preferably formed along the second direction, and the scan line drive circuit and the enable line drive circuit are preferably formed along the first direction.

According to the configuration in Application Example 12, the data line extending in the first direction is electrically connected to the data line drive circuit formed along the second direction, and the scan line and the enable line extending in the second direction are electrically connected to the scan line drive circuit and the enable line drive circuit formed along the first direction, respectively. Thus, the data line drive circuit, the scan line drive circuit, and the enable line drive circuit can be easily arranged without interfering with one another.

Application Example 13

In the electro-optical device according to Application Example 13, the scan line drive circuit is preferably formed along a first side, and the enable line drive circuit is preferably formed along a second side opposite from the first side with respect to the pixel circuit.

According to the configuration in Application Example 13, the scan line drive circuit and the enable line drive circuit formed along the first direction are arranged on the sides opposite from each other. Thus, the scan line drive circuit and the enable line drive circuit can be easily arranged without interfering with one another.

Application Example 14

An electro-optical device according to Application Example 14 includes a scan line, a data line, a pixel circuit located at a position corresponding to an intersection of the scan line and the data line, an enable line, a first potential line supplied with a first potential, a second potential line supplied with a second potential, and a third potential line supplied with a third potential. The pixel circuit includes a light emitting element, a memory circuit, and a first transistor having a gate electrically connected to the enable line. The memory circuit is arranged between the first potential line and the second potential line. The light emitting element and the first transistor are arranged in series between the second potential line and the third potential line. An absolute value of a potential difference between the third potential and the second potential is greater than an absolute value of a potential difference between the first potential and the second potential.

According to the configuration in Application Example 1, the pixel circuit includes the memory circuit, and thus gray-scale display can be performed by writing a digital signal expressed by binary values of ON and OFF to the memory circuit and controlling a ratio of light emission to non-light-emission of the light emitting element. The first transistor having the gate electrically connected to the enable line and being arranged in series with the light emitting element is included. Thus, light emission and non-light-emission of the light emitting element can be controlled independently from the memory circuit by turning the first transistor into ON and OFF. Therefore, in each pixel circuit, the light emitting element can be in the non-light-emissionon state in the period during which the image signal is written to the memory circuit. After the image signal is written to the memory circuit, the light emitting element can be in a state of being allowed to emit light with a predetermined period of time as a display period. Thus, accurate gray scales can be achieved by time-division driving. An absolute value of a potential difference between the third potential and the second potential being supplied to the light emitting element and the first transistor is greater than an absolute value of a potential difference between the first potential and the second potential being supplied to the memory circuit. In other words, the high-voltage power supply at the third potential and the second potential causes the light emitting element to emit light, and the low-voltage power supply at the first potential and the second potential causes the memory circuit to operate. Thus, brightness of light emission of the light emitting element can be increased, and a fine memory circuit can be achieved to operate at a high speed. In this way, the image signal can be written or rewritten at a high speed, and display can be brighter. As a result, the electro-optical device that can display a bright and high-quality image having a high resolution and multiple gray scales can be achieved.

Application Example 15

In the electro-optical device according to Application Example 15, a source of the first transistor is preferably electrically connected to one of the second potential line and the third potential line, and the light emitting element is preferably arranged between a drain of the first transistor and the other of the second potential line and the third potential line.

According to the configuration in Application Example 15, the source of the first transistor is electrically connected to one of the second potential line and the third potential line, and the light emitting element is arranged on the drain side of the first transistor. Thus, the first transistor is arranged on the low potential side with respect to the light emitting element when the first transistor is the N-type, and the first transistor is arranged on the high potential side with respect to the light emitting element when the first transistor is the P-type. Accordingly, when the first transistor is in the ON-state, the electrical conductivity of the first transistor can be increased even with a small source-drain voltage of the first transistor. In other words, the first transistor can be linearly operated when the first transistor is in the ON-state and the light emitting element emits light. In this way, most of the potential difference between the third potential and the second potential as the high-voltage power supply is applied to the light emitting element, resulting in a less susceptible state to variation in the threshold voltage of the first transistor when the light emitting element emits light. As a result, uniformity of brightness among pixels can be improved.

Application Example 16

In the electro-optical device according to Application Example 16, an ON-resistance of the first transistor is preferably sufficiently lower than an ON-resistance of the light emitting element.

According to the configuration in Application Example 16, the first transistor can be linearly operated when the first transistor is in the ON-state and the light emitting element emits light. As a result, most of a potential drop occurring in the light emitting element and the first transistor is applied to the light emitting element, resulting in a less susceptible state to variation in the threshold voltage of the first transistor when the light emitting element emits light. Thus, variation in brightness and gray scale shift among pixels can be reduced.

Application Example 17

In the electro-optical device according to Application Example 17, the pixel circuit preferably includes a second transistor having a gate electrically connected to the memory circuit, and the light emitting element, the first transistor, and the second transistor are preferably arranged in series between the second potential line and the third potential line.

According to the configuration in Application Example 17, the second transistor having the gate electrically connected to the memory circuit is arranged in series with the light emitting element and the first transistor between the second potential line and the third potential line. Thus, while the first transistor is in the ON-state, the light emitting element emits light when the second transistor is turned into the ON-state by the image signal written to the memory circuit. However, the light emitting element does not emit light without the first transistor being in the ON-state even when the second transistor is turned into the ON-state by the image signal. Therefore, light emission and non-light-emission of the light emitting element can be controlled by the first transistor independently from the memory circuit.

Application Example 18

In the electro-optical device according to Application Example 18, a source of the second transistor is preferably electrically connected to one of the second potential line and the third potential line, and the light emitting element is preferably arranged between a drain of the second transistor and the other of the second potential line and the third potential line.

According to the configuration in Application Example 18, the source of the second transistor is electrically connected to one of the second potential line and the third potential line, and the light emitting element is arranged on the drain side of the second transistor. Thus, the second transistor is arranged on the low potential side with respect to the light emitting element when the second transistor is the N-type, and the second transistor is arranged on the high potential side with respect to the light emitting element when the second transistor is the P-type. Accordingly, when the second transistor is in the ON-state, the electrical conductivity of the second transistor can be increased even with a small source-drain voltage of the second transistor. In other words, the first transistor and the second transistor can be linearly operated when the first transistor and the second transistor are in the ON-state and the light emitting element emits light. In this way, most of the potential difference between the third potential and the second potential as the high-voltage power supply is applied to the light emitting element, resulting in a less susceptible state to variation in the threshold voltage of the first transistor and the second transistor when the light emitting element emits light. As a result, uniformity of brightness among pixels can be improved.

Application Example 19

In the electro-optical device according to Application Example 19, an ON-resistance of the second transistor is preferably sufficiently lower than an ON-resistance of the light emitting element.

According to the configuration in Application Example 19, the second transistor can be linearly operated when the first transistor and the second transistor are in the ON-state and the light emitting element emits light. As a result, most of a potential drop occurring in the light emitting element, the first transistor, and the second transistor, is applied to the light emitting element, resulting in a less susceptible state to variation in the threshold voltage of the first transistor and the second transistor, when the light emitting element emits light. Thus, variation in brightness and gray scale shift among pixels can be reduced.

Application Example 20

An electronic apparatus according to Application Example 20 includes the electro-optical device described in the application examples above.

According to the configuration of Application Example 20, a high-quality image can be displayed on the electronic apparatus such as a head-mounted display.

BRIEF DESCRIPTION OF THE DRAWINGS

The invention will be described with reference to the accompanying drawings, wherein like numbers reference like elements.

FIG. 8 illustrates a table of a time-division gray scale system in the electro-optical device according to the exemplary embodiment.

DESCRIPTION OF EXEMPLARY EMBODIMENTS

Figure 1:
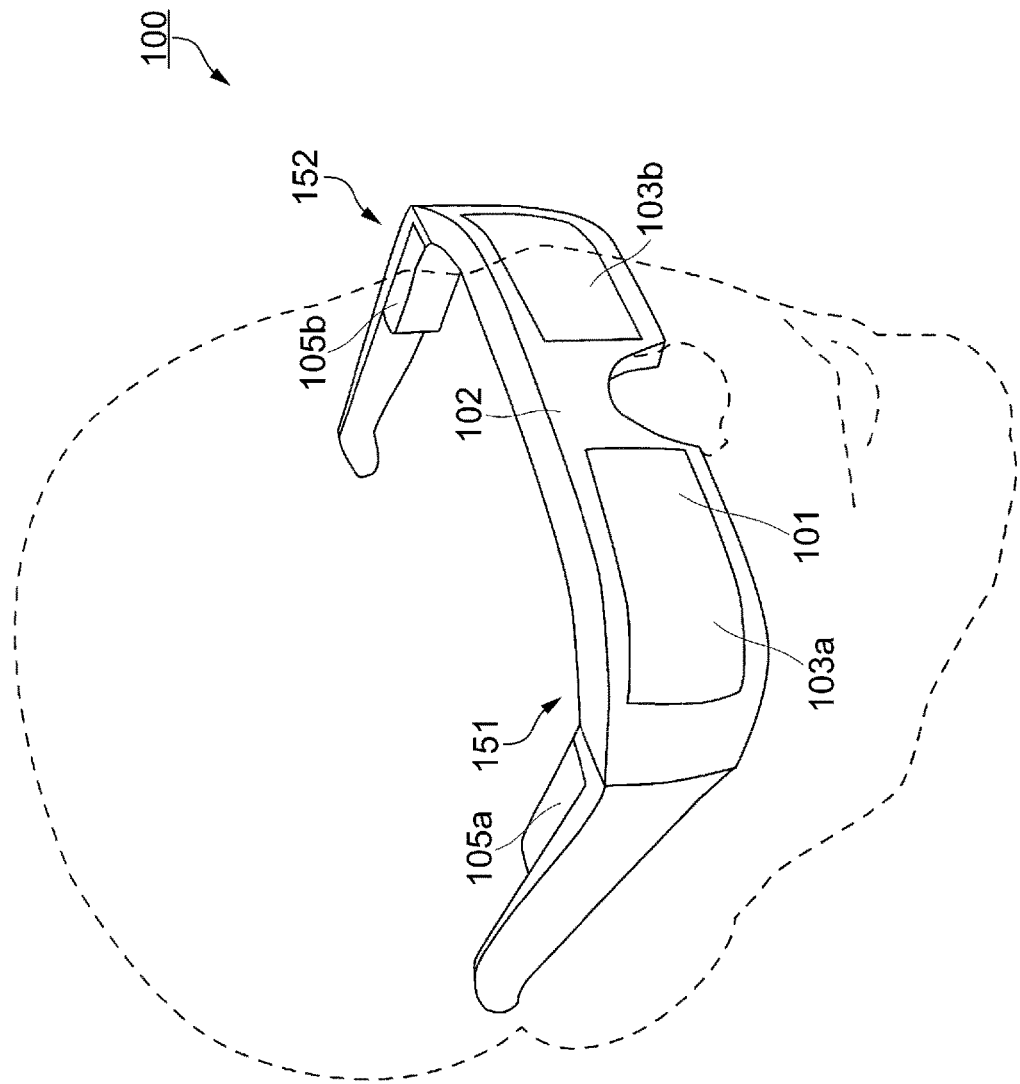
FIG. 1 schematically illustrates an electronic apparatus according to the exemplary embodiment.

Exemplary embodiments of the invention will be described below with reference to the drawings. In the drawings referred to below, layers, members, and the like are not to scale to make the layers, members, and the like recognizable in size.

Outline of Electronic Apparatus

Outline of an electronic apparatus will now be described with reference to FIG. 1. FIG. 1 schematically illustrates an electronic apparatus according to the exemplary embodiment.

Figure 3:
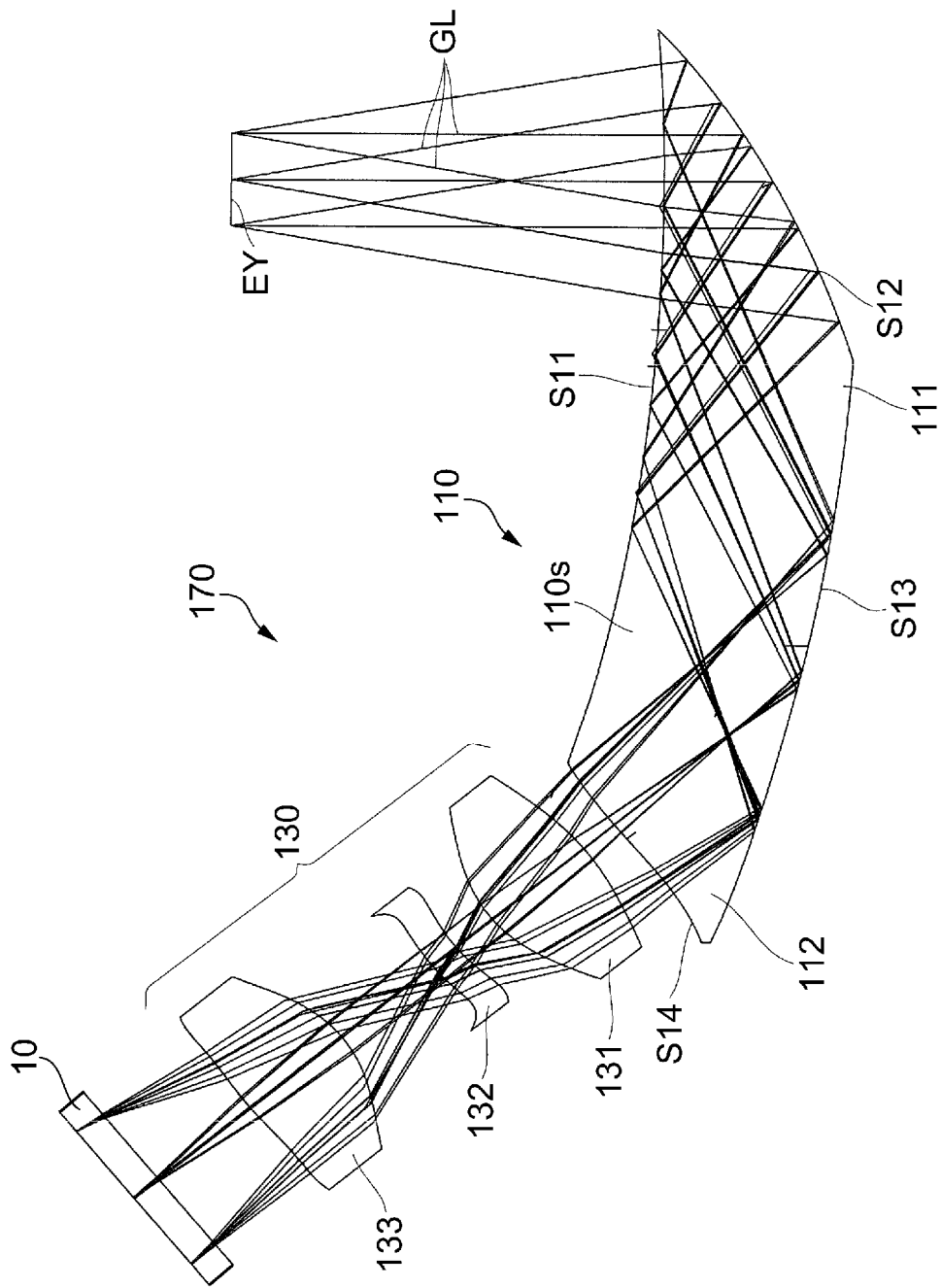
FIG. 3 illustrates an optical system of the electronic apparatus according to the exemplary embodiment.

A head-mounted display 100 is an example of the electronic apparatus according to the exemplary embodiment, and includes an electro-optical device 10 (refer to FIG. 3). As illustrated in FIG. 1, the head-mounted display 100 has an appearance like glasses. The head-mounted display 100 allows a user who wears the head-mounted display 100 to view image light GL of an image (refer to FIG. 3) and allows the user to view outside light as a see-through image. Specifically, the head-mounted display 100 has a see-through function that displays a superimposition of the outside light and the image light GL, has a wide angle of view and high performance, and is also small and light.

The head-mounted display 100 includes a see-through member 101 that covers the eyes of the user, a frame 102 that supports the see-through member 101, and a first built-in device unit 105a and a second built-in device unit 105b that are attached to the frame 102 over an area extending from cover portions at respective ends of the frame 102 over a portion of temples behind.

The see-through member 101 is a thick, curved optical member, namely a transparent eye cover, covering the eyes of the user and is separated into a first optical portion 103a and a second optical portion 103b. As seen on the left side in FIG. 1, a first display apparatus 151, which includes a combination of the first optical portion 103a and the first built-in device unit 105a, is a part to display a virtual image for the right eye as a see-through image and functions by itself as an electronic apparatus with a display function. As seen on the right side in FIG. 1, a second display apparatus 152, which includes a combination of the second optical portion 103b and the second built-in device unit 105b, is a part to display a virtual image for the left eye as a see-through image and functions by itself as an electronic apparatus with a display function. Each of the first display apparatus 151 and the second display apparatus 152 has the electro-optical device 10 (refer to FIG. 3) incorporated therein.

Internal Structure of Electronic Apparatus

Figure 2:
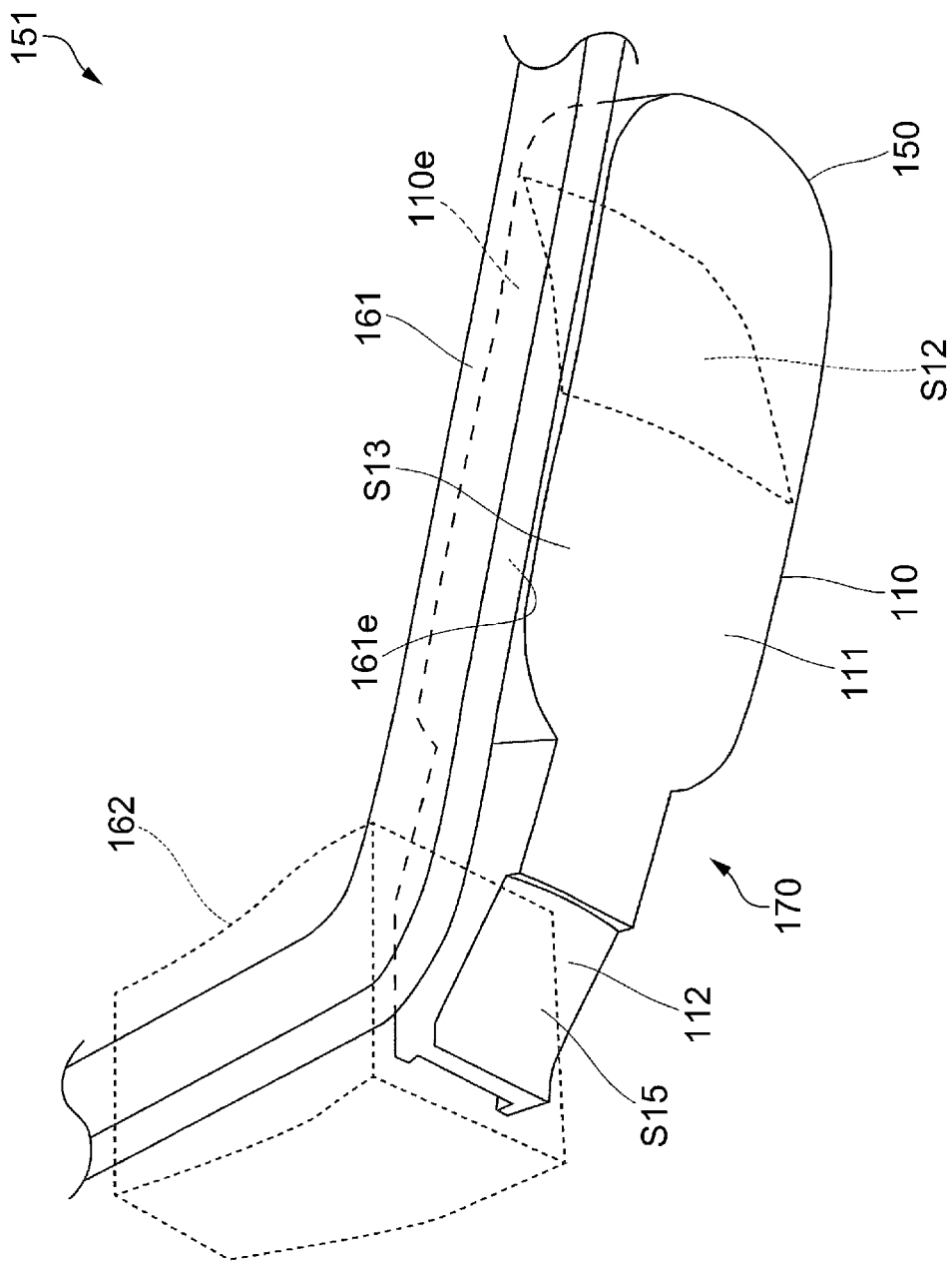
FIG. 2 illustrates an internal structure of the electronic apparatus according to the exemplary embodiment.

FIG. 2 illustrates an internal structure of the electronic apparatus according to the exemplary embodiment. FIG. 3 illustrates an optical system of the electronic apparatus according to the exemplary embodiment. The internal structure and the optical system of the electronic apparatus will now be described with reference to FIG. 2 and FIG. 3. While FIG. 2 and FIG. 3 illustrate the first display apparatus 151 as an example of the electronic apparatus, the second display apparatus 152 is symmetrical to the first display apparatus 151 and has substantially the same structure. Accordingly, only the first display apparatus 151 will be described here and detailed description of the second display apparatus 152 will be omitted.

As illustrated in FIG. 2, the first display apparatus 151 includes a projection see-through device 170 and the electro-optical device 10 (refer to FIG. 3). The projection see-through device 170 includes a prism 110 to serve as a light guide member, a transparent member 150, and a projector lens 130 for image formation (refer to FIG. 3). The prism 110 and the transparent member 150 are integrated together by bonding and are firmly fixed to the bottom of a frame 161 such that a top face 110e of the prism 110 and a bottom face 161e of the frame 161 are held in contact with each other, for example.

The projector lens 130 is fixed to an end of the prism 110 through a lens barrel 162 that houses the projector lens 130. The prism 110 and the transparent member 150 in the projection see-through device 170 correspond to the first optical portion 103a illustrated in FIG. 1. The projector lens 130 and the electro-optical device 10 in the projection see-through device 170 correspond to the first built-in device unit 105a illustrated in FIG. 1.

The prism 110 in the projection see-through device 170 is an arc-shaped member that is curved along the face of the user when viewed in a plan view and may be considered to be formed of a first prism portion 111 on the central side closer to the nose and a second prism portion 112 on the peripheral side away from the nose. The first prism portion 111 is disposed on the light emission side and has a first face S11 (refer to FIG. 3), a second face S12, and a third face S13, each of which serves as a side face having an optical function.

The second prism portion 112 is disposed on the light incident side and has a fourth face S14 (refer to FIG. 3) and a fifth face S15, each of which serves as a side face having an optical function. Of these faces, the first face S11 and the fourth face S14 are adjacent to each other, the third face S13 and the fifth face S15 are adjacent to each other, and the second face S12 is disposed between the first face S11 and the third face S13. Also, the prism 110 has the top face 110e that is adjacent to the first face S11 to the fourth face S14.

The prism 110 is formed from a resin material with high optical transparency in a visible range and is molded, for example, by pouring a thermoplastic resin into a mold and curing the resin. While a body portion 110s (refer to FIG. 3) of the prism 110 is an integrally formed article, it can be considered to be formed of the first prism portion 111 and the second prism portion 112. The first prism portion 111 can guide and output the image light GL and also allows outside light to be seen-through. The second prism portion 112 can receive and guide the image light GL.

The transparent member 150 is integrally fixed to the prism 110. The transparent member 150 is a member that aids in the see-through function of the prism 110 and is also referred to as an auxiliary prism. The transparent member 150 has high optical transparency in a visible range and is formed from a resin material with a refractive index that is substantially equal to the refractive index of the body portion 110s of the prism 110. The transparent member 150 is formed, for example, by molding thermoplastics resin.

As illustrated in FIG. 3, the projector lens 130 includes three lenses 131, 132, and 133 that are arranged along the optical axis on the light input side. Each of the lenses 131, 132, and 133 is rotationally symmetrical with respect to the central axis of the light input surfaces of the lenses. At least one of the lenses 131, 132, and 133 is an aspherical lens.

The projector lens 130 directs the image light GL emitted from the electro-optical device 10 into the prism 110 to re-form an image on an eye EY. In other words, the projector lens 130 is a relay optical system to re-form an image of the image light GL emitted from each pixel of the electro-optical device 10 on the eye EY through the prism 110. The projector lens 130 is held in the lens barrel 162 and the electro-optical device 10 is fixed to an end of the lens barrel 162. The second prism portion 112 of the prism 110 is connected to the lens barrel 162, which holds the projector lens 130, to indirectly support the projector lens 130 and the electro-optical device 10.

An electronic apparatus of a type that is mounted on the head of the user to cover the eyes, such as the head-mounted display 100, is required to be small and light. The electro-optical device 10 used in the electronic apparatus such as the head-mounted display 100 is required to provide high resolution, fine pixels, multiple gray scales of display, and low power consumption.

Configuration of Electro-Optical Device

Figure 4:
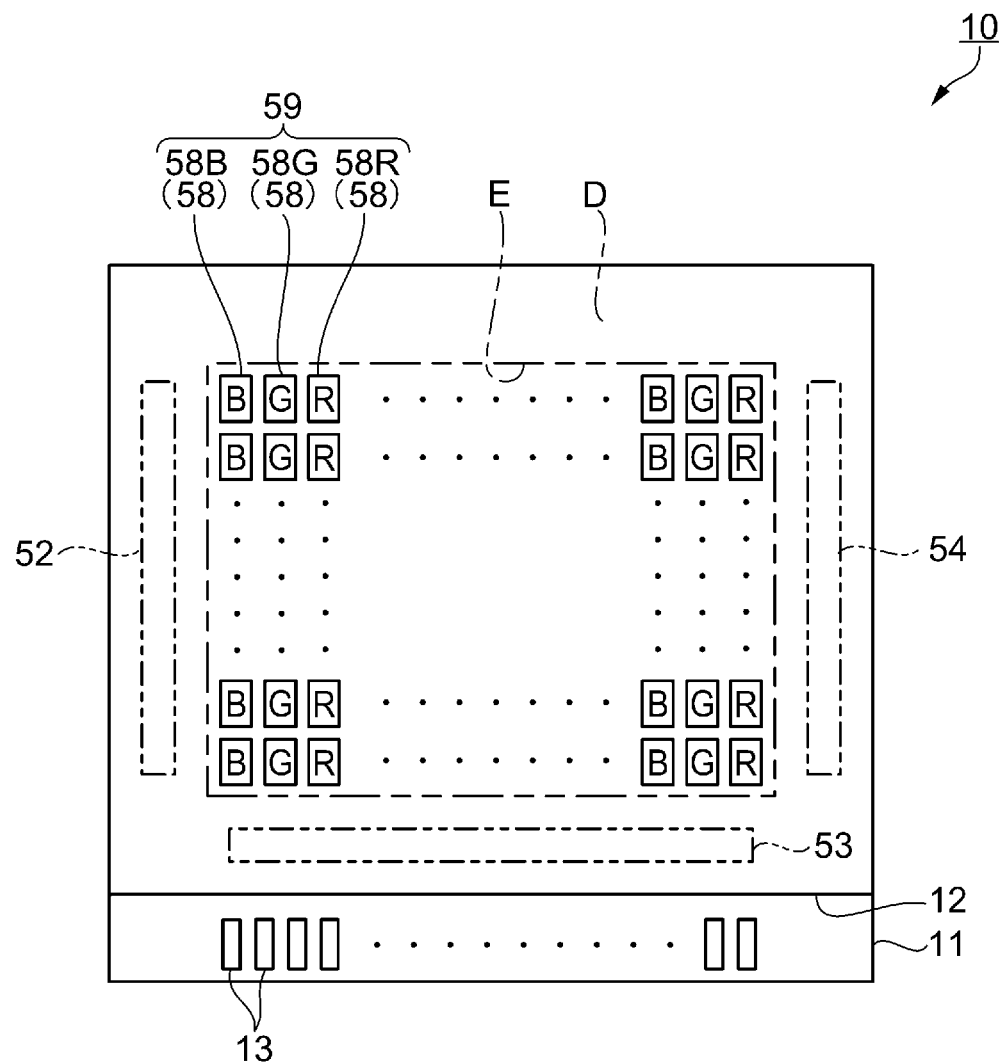
FIG. 4 illustrates a schematic plan view illustrating a configuration of an electro-optical device according to the exemplary embodiment.

A configuration of the electro-optical device will now be described with reference to FIG. 4. FIG. 4 is a schematic plan view illustrating a configuration of the electro-optical device according to the exemplary embodiment. An organic EL device that includes an organic EL element as a light emitting element is explained as an example of the electro-optical device 10 in the exemplary embodiment. As illustrated in FIG. 4, the electro-optical device 10 according to the exemplary embodiment includes an element substrate 11 and a protective substrate 12. The element substrate 11 is provided with a color filter (not illustrated). The element substrate 11 and the protective substrate 12 are arranged to face each other and are bonded together with filler (not illustrated).

The element substrate 11 is formed from, for example, a single-crystal semiconductor substrate, such as a single-crystal silicon substrate. The element substrate 11 has a display region E and a non-display region D surrounding the display region E. In the display region E, for example, sub-pixels 58B that emit blue light (B), sub-pixels 58G that emit green light (G), and sub-pixels 58R that emit red light (R) are arranged in a matrix, for example. A light emitting element 20 (refer to FIG. 6) is provided in each of the sub-pixels 58B, the sub-pixels 58G, and the sub-pixels 58R. In the electro-optical device 10, a pixel 59 that includes the sub-pixel 58B, the sub-pixel 58G, and the sub-pixel 58R is a display unit to show full color images.

In this specification, the sub-pixel 58B, the sub-pixel 58G, and the sub-pixel 58R are not distinguished from one another and may be collectively referred to as a sub-pixel 58. The display region E is a region where light emitted from the sub-pixel 58 is transmitted and contributes to display. The non-display region D is a region where light emitted from the sub-pixel 58 is not transmitted and does not contribute to display.

The element substrate 11 is larger than the protective substrate 12 and extends out of the protective substrate 12 in an extending direction of a first side (vertical side on the left side of FIG. 4) of the element substrate 11. A side (vertical side on the right side of FIG. 4) opposite from the first side of the element substrate 11 is a second side. A side intersecting the first side and the second side of the element substrate 11 on the side on which the element substrate 11 extends out of the protective substrate 12 is a third side.

A plurality of external connection terminals 13 are arranged along the third side on a portion of the element substrate 11 extending out of the protective substrate 12. A data line drive circuit 53 is provided along the third side between the display region E and the plurality of external connection terminals 13. A scan line drive circuit 52 is provided along the first side between the display region E and the first side. An enable line drive circuit 54 is provided along the second side between the display region E and the second side. In such arrangement, the data line drive circuit 53, the scan line drive circuit 52, and the enable line drive circuit 54 can be easily arranged on the element substrate 11 without interfering with one another.

The protective substrate 12 is smaller than the element substrate 11 and is disposed so that the external connection terminals 13 are exposed. The protective substrate 12 is a light transparent substrate such as a quartz substrate or a glass substrate, for example. The protective substrate 12 is disposed to face at least the display region E to protect the light emitting elements 20 disposed in the sub-pixels 58 in the display region E from being damaged.

The color filter may be provided on the light emitting elements 20 in the element substrate 11 or it may be provided on the protective substrate 12. On the other hand, the color filter may not be required in such a configuration in which light corresponding to each color is emitted from the light emitting element 20. The protective substrate 12 may not be required, and instead of the protective substrate 12, a protective layer to protect the light emitting element 20 may be provided on the element substrate 11.

In this specification, a direction along the third side on which the external connection terminals 13 are arranged is referred to as X direction being a second direction or as a row direction, and a direction along the first side and the second side or a column direction is referred to as Y direction being a first direction. Therefore, the data line drive circuit 53 is formed along X direction, and the scan line drive circuit 52 and the enable line drive circuit 54 are formed along Y direction.

In the exemplary embodiment, the sub-pixels 58 are arranged in a so-called stripe arrangement in which the sub-pixels 58 that emit the same color are arranged in the column direction, i.e., the Y direction, and the sub-pixels 58 that emit different colors are arranged in the row direction, i.e., the X direction. The arrangement of the sub-pixels 58 in the row direction is not limited to the order of B, G, and R as illustrated in FIG. 4 and may be in the other order such as R, G, and B, for example. The arrangement of the sub-pixels 58 is not limited to the stripe arrangement and may be a delta arrangement, a Bayer arrangement, or an S-stripe arrangement. In addition, the sub-pixels 58B, the sub-pixels 58G, and the sub-pixels 58R are neither limited to the same shape nor to the same size.

Circuit Configuration of Electro-Optical Device

Figure 5:
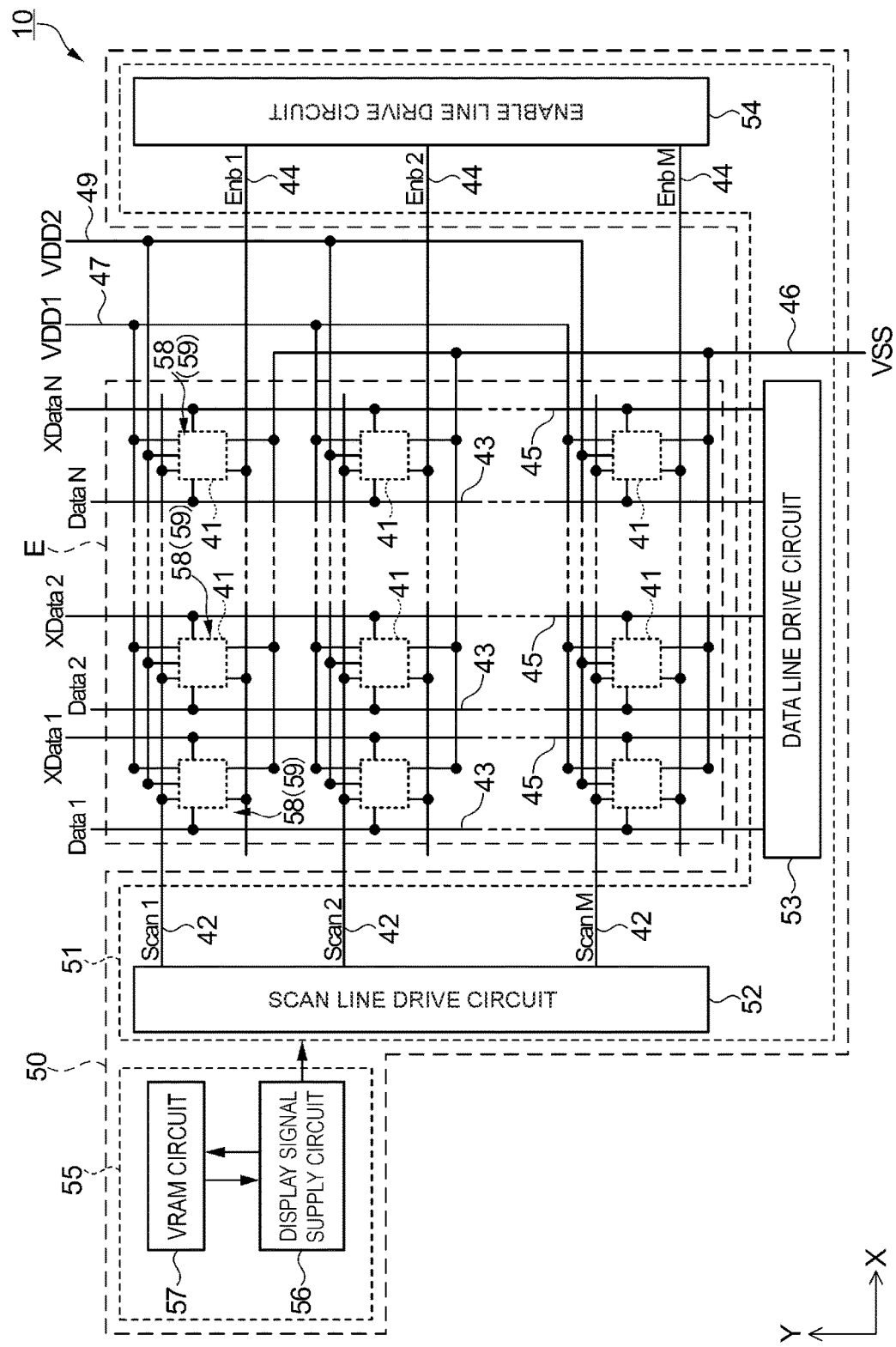
FIG. 5 illustrates a circuit block diagram of the electro-optical device according to the exemplary embodiment.

A circuit configuration of the electro-optical device will now be described with reference to FIG. 5. FIG. 5 is a circuit block diagram of the electro-optical device according to the exemplary embodiment. As illustrated in FIG. 5, a plurality of scan lines 42, a plurality of data lines 43, and a plurality of sub-pixels 58 are formed in the display region E of the electro-optical device 10. The scan lines 42 and the data lines 43 cross each other. The sub-pixels 58 are arranged in a matrix corresponding to the respective intersections of the scan lines 42 and the data lines 43. Each sub-pixel 58 possesses a pixel circuit 41 that includes the light emitting element 20 (refer to FIG. 9) and the like.

In the display region E of the electro-optical device 10, enable lines 44 are formed corresponding to the respective scan lines 42. The scan lines 42 and the enable lines 44 extend in the row direction. Thus, one scan line 42 can easily correspond to one enable line 44. As a result, as described alter, after the scan line 42 is selected for each row, that is, after an image signal is rewritten, the light emitting element 20 can be caused to emit light immediately. Also, formed in the display region E are complementary data lines 45 that correspond to the respective data lines 43. The data lines 43 and the complementary data lines 45 extend in the column direction.

In the electro-optical device 10, sub-pixels 58 form a matrix of M rows×N columns in the display region E. Also, M scan lines 42, M enable lines 44, N data lines 43, and N complementary data lines 45 are formed in the display region E. Note that, M and N are integers greater than or equal to 2, and M=720 and N=1280×p as an example in the exemplary embodiment. Here, p is an integer of one or greater and indicates the number of basic colors for emission. In the exemplary embodiment, p=3, as an example, that is, the basic colors for display are three colors of R, G, and B.

The electro-optical device 10 includes a driving unit 50 outside the display region E. The driving unit 50 supplies various signals to the respective pixel circuits 41 arranged in the display region E, such that an image is displayed in the display region E, using the pixels 59 as display units. In the exemplary embodiment, each of the pixels 59 includes the sub-pixels 58 for the three colors. The driving unit 50 includes a drive circuit 51 and a control unit 55. The control unit 55 supplies a display signal to the drive circuit 51. The drive circuit 51 supplies a drive signal to each pixel circuit 41 through the plurality of scan lines 42, the plurality of data lines 43, and the plurality of enable lines 44. The drive signal is based on the display signal.

Furthermore, a high potential line 47 as a first potential line supplied with a first potential, a low potential line 46 as a second potential line supplied with a second potential, and a high potential line 49 as a third potential line supplied with a third potential are arranged in the non-display region D and the display region E. To each pixel circuit 41, the high potential line 47 supplies the first potential, the low potential line 46 supplies the second potential, and the high potential line 49 supplies the third potential.

In the exemplary embodiment, the first potential V1 is a first high potential VDD1 (for example, V1=VDD1=3.0 V), the second potential V2 is a low potential VSS (for example, V2=VSS=0 V), and the third potential V3 is a second high potential VDD2 (for example, V3=VDD2=7.0 V). Therefore, the first potential is higher than the second potential, and the third potential is higher than the first potential. In other words, an absolute value of a potential difference between the third potential and the second potential is greater than an absolute value of a potential difference between the first potential and the second potential.

In the exemplary embodiment, the first potential (first high potential VDD1) and the second potential (low potential VSS) constitute a low-voltage power supply, and the third potential (high potential VDD2) and the second potential (low potential VSS) constitute a high-voltage power supply. The second potential is a potential as a reference in the low-voltage power supply and the high-voltage power supply.

While the second potential line (low potential line 46), the first potential line (high potential line 47), and the third potential line (high potential line 49) extend in the row direction within the display region E as one example in the exemplary embodiment, they may extend in the column direction, some of them may extend in the row direction while the others extend in the column direction, or they may be arranged in a grid pattern in the row and column directions.

The drive circuit 51 includes the scan line drive circuit 52, the data line drive circuit 53, and the enable line drive circuit 54. The drive circuit 51 is provided in the non-display region D (refer to FIG. 4). In the exemplary embodiment, the drive circuit 51 and the pixel circuit 41 are formed on the element substrate 11 as illustrated in FIG. 4. In the exemplary embodiment, a single-crystal silicon substrate is used for the element substrate 11. Specifically, the drive circuit 51, the pixel circuit 41, and the like are formed from elements, such as transistors, which are formed on the single-crystal silicon substrate.

The scan lines 42 are electrically connected to the scan line drive circuit 52. Thus, the scan line 42 can be easily driven independently from the enable line 44. The scan line drive circuit 52 outputs a scan signal (Scan) to each scan line 42. The scan signal does or does not select the pixel circuit 41 in the row direction. The scan line 42 transmits the scan signal to the pixel circuit 41. In other words, the scan signal has a selection-state and a non-selection-state. Each scan line 42 is appropriately selected, receiving the scan signal from the scan line drive circuit 52. The scan signal is a potential between the second potential (low potential VSS) and the third potential (second high potential VDD2).

As described later, since both of a fourth transistor 34 and an eighth transistor 38 being a complementary transistor of the fourth transistor 34 are the N-type (refer to FIG. 9) in the exemplary embodiment, the scan signal (selection signal) in the selection-state is High (high potential), and the scan signal (non-selection signal) is Low (low potential). The selection signal is set to be a high potential higher than or equal to the first potential V1 and is preferably the third potential V3. The non-selection signal is set to be a low potential lower than or equal to the second potential V2 and is preferably the second potential V2.

Note that, to specify a scan signal supplied to the scan line 42 in an i-th row of the M scan lines 42, the scan signal is designated as a scan signal Scan i in the i-th row. The scan line drive circuit 52 includes a shift register circuit (not illustrated). Signals shifted in the shift register circuit are output from each stage as shift-output signal. A scan signal Scan 1 in a first row to a scan signal Scan M in an M-th row are generated from the shift-output signals.

The data lines 43 and the complementary data lines 45 are electrically connected to the data line drive circuit 53. The data line drive circuit 53 may include a shift register circuit, a decoder circuit, a multiplexer circuit, or the like (not illustrated). The data line drive circuit 53 supplies image signals (Data) to each of the N data lines 43 and supplies complementary image signals (XData) to each of the N complementary data lines 45, in synchronization with the selection of the scan lines 42. The image signal and the complementary image signal are digital signals and have one of the first potential (VDD1 in the exemplary embodiment) and the second potential (VSS in the exemplary embodiment).

Note that, to specify an image signal supplied to the data line 43 in a j-th row of the N data lines 43, the image signal is designated as an image signal Data j in the j-th row. Likewise, to specify a complementary image signal supplied to the complementary data line 45 in a j-th row of the N complementary data lines 45, the complementary image signal is designated as a complementary image signal XData j in the j-th row.

The scan lines 42 are electrically connected to the scan line drive circuit 52. Thus, the enable line 44 can be easily driven independently from the scan line 42. The enable line drive circuit 54 outputs enable signals to the enable lines 44 which separately correspond to the respective rows. The enable signals are specific to the rows. The enable line 44 transmits the enable signal to the pixel circuit 41 in the corresponding row. The enable signal has an active state and an inactive state. The enable line 44 may be appropriately turned into the active state by receiving the enable signal from the enable line drive circuit 54. The enable signal is a potential between the second potential (low potential VSS) and the third potential (second high potential VDD2).

As described later, since a first transistor 31 is the P-type (refer to FIG. 9) in the exemplary embodiment, the enable signal in the active state, i.e., the active signal, is Low (low potential), and the enable signal in the inactive state, i.e., the non-active signal, is High, which is a high potential. Given that the first potential, the second potential, and the third potential are represented as V1, V2, and V3, respectively, the active signal is set to be lower than or equal to V3−(V1−V2) and is preferably the second potential (V2). The non-selection signal is set to be higher than or equal to the third potential (V3) and is preferably the third potential (V3).

Note that, to specify an enable signal supplied to the enable line 44 in an i-th row of the M enable lines 44, the enable signal is designated as an enable signal Enb i in the i-th row. The enable line drive circuit 54 may supply an active signal or a inactive signal as the enable signal for each row, or may simultaneously supply an active signal or a inactive signal as the enable signal to a plurality of rows. In the exemplary embodiment, the enable line drive circuit 54 simultaneously supplies the active signal or the inactive signal to all the pixel circuits 41 arranged in the display region E through the enable lines 44.

The control unit 55 includes a display signal supply circuit 56 and a video random access memory (VRAM) circuit 57. The VRAM circuit 57 temporarily stores a frame image and the like. The display signal supply circuit 56 generates a display signal from a frame image temporarily stored in the VRAM circuit 57 and supplies it to the drive circuit 51. The display signal herein includes an image signal, a clock signal, and the like.

In the exemplary embodiment, the drive circuit 51 and the pixel circuit 41 are formed on the element substrate 11. In the exemplary embodiment, a single-crystal silicon substrate is used for the element substrate 11. Specifically, the drive circuit 51 and the pixel circuit 41 are formed from transistor elements, which are formed on the single-crystal silicon substrate.

The control unit 55 includes a semiconductor integrated circuit that is formed on a different substrate (not illustrated) from the element substrate 11. The semiconductor integrated circuit may be formed on a single-crystal semiconductor substrate and the like. The substrate on which the control unit 55 is formed is electrically connected to the external connection terminals 13 provided on the element substrate 11 by using a flexible printed circuit (FPC). Through the FPC, the display signal is supplied to the drive circuit 51 from the control unit 55.

Configuration of Pixel

Figure 6:
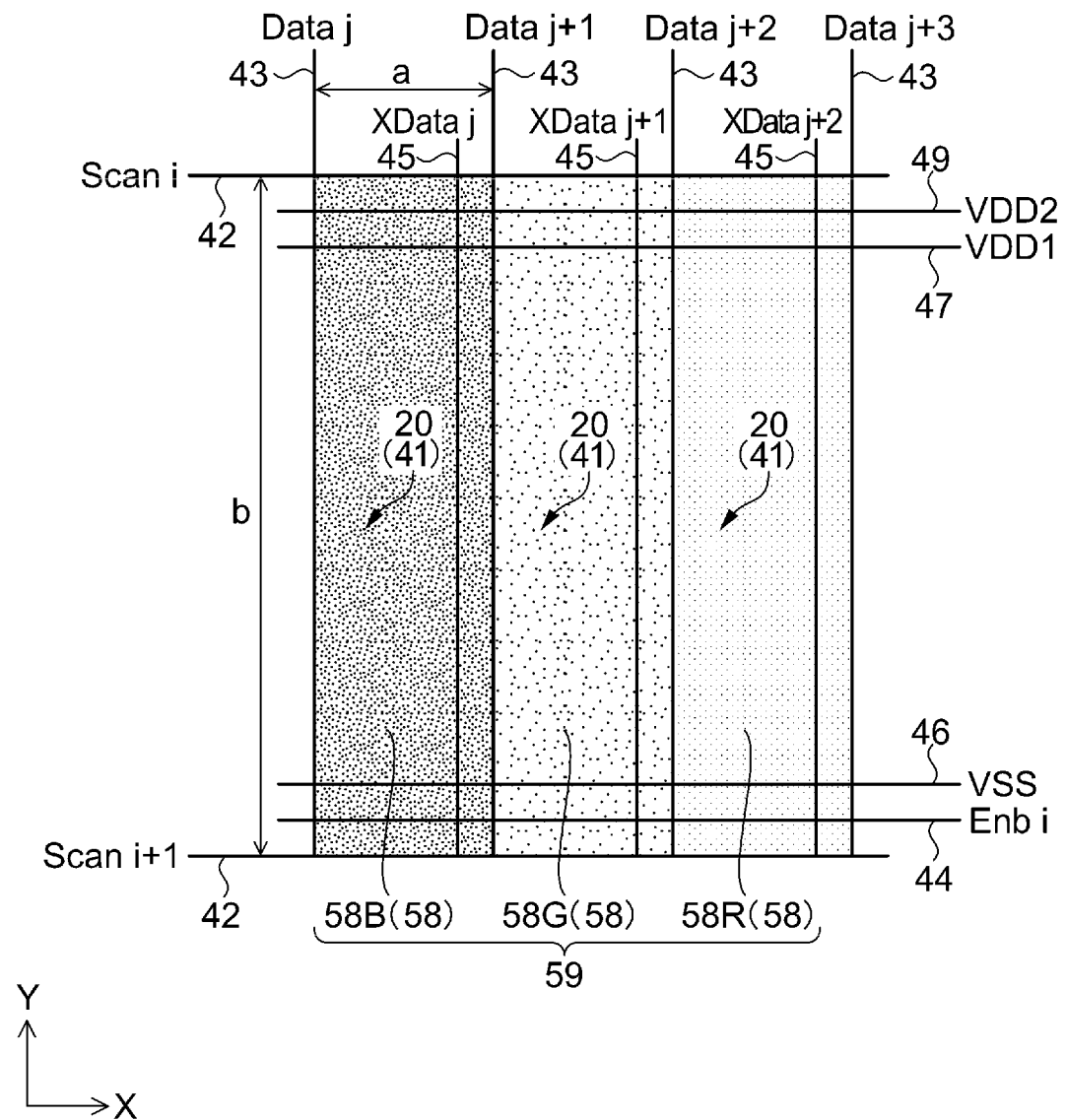
FIG. 6 illustrates a configuration of a pixel according to the exemplary embodiment.

A configuration of a pixel according to the exemplary embodiment will now be described with reference to FIG. 6. FIG. 6 illustrates a diagram illustrating the configuration of the pixel according to the exemplary embodiment.

As described above, in the electro-optical device 10, the pixel 59 that includes the sub-pixel 58 (the sub-pixel 58B, the sub-pixel 58G, and the sub-pixel 58R) forms a display unit to display an image. In the exemplary embodiment, the length a of the sub-pixel 58 in the X direction as the row direction of the sub-pixel 58 is 4 micrometers (μm), and the length b of the sub-pixel 58 in the Y direction as the column direction of the sub-pixel 58 is 12 micrometers (μm). In other words, the pitch at which the sub-pixels 58 are arranged in the X direction as the row direction is 4 micrometers (μm), and the pitch at which the sub-pixels 58 are arranged in the Y direction as the column direction is 12 micrometers (μm).

Each sub-pixel 58 possesses the pixel circuit 41 that includes the light emitting element 20. The light emitting element 20 emits white light. The electro-optical device 10 includes the color filter (not illustrated), which transmits light emitted from the light emitting element 20. The color filter includes p kinds of color filters that correspond to p basic colors for display. In the exemplary embodiment, the number of basic colors is set as p=3, and color filters for colors B, G, and R, are arranged to correspond to the sub-pixel 58B, the sub-pixel 58G, and the sub-pixel 58R, respectively.

In the exemplary embodiment, an organic electroluminescence (EL) element is used as an example of the light emitting element 20. The organic EL element may have an optical resonant structure that enhances the intensity of light with a specific wavelength. Specifically, the organic EL element may be configured such that a blue light component is extracted from the white light emitted from the light emitting element 20 in the sub-pixel 58B; a green light component is extracted from the white light emitted from the light emitting element 20 in the sub-pixel 58G; and a red light component is extracted from the white light emitted from the light emitting element 20 in the sub-pixel 58R.

As another example other than the examples described above, the number of basic colors may be set as p=4, so that, in addition to the color filters for B, G, and R, the sub-pixel 58 including a color filter for another color, for example, white color which substantially disposed no color filter, or the sub-pixel 58 including a color filter for another color such as yellow and cyan may be prepared. As the light emitting element 20, a light emitting diode element using gallium nitride (GaN) and the like, or a semiconductor laser element may also be used.

Digital Driving in Electro-Optical Device

Figure 7:
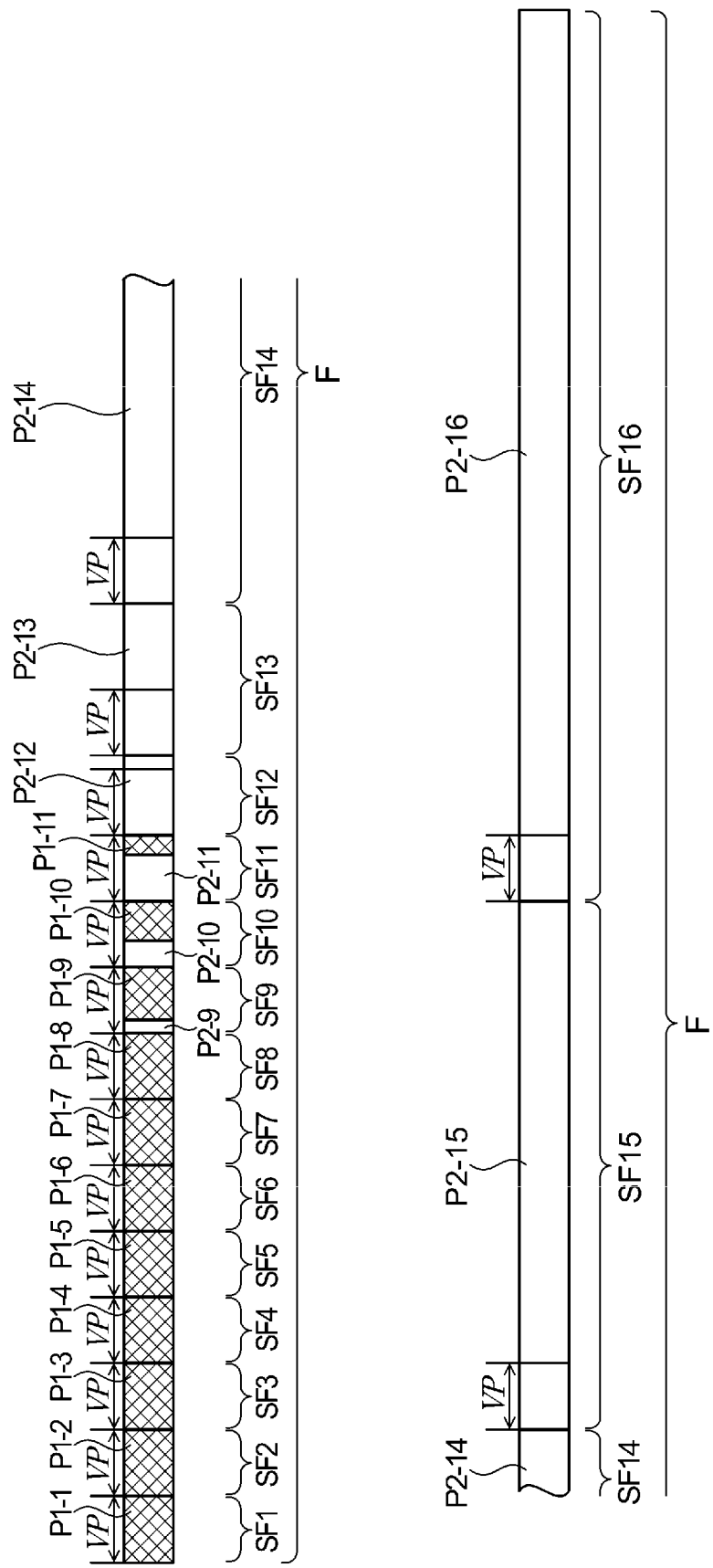
FIG. 7 illustrates digital driving in the electro-optical device according to the exemplary embodiment.

An image display method by digital driving in the electro-optical device 10 according to the exemplary embodiment will now be described with reference to FIGS. 7 and 8. FIG. 7 illustrates digital driving in the electro-optical device according to the exemplary embodiment. FIG. 8 illustrates a table of a time-division gray scale system in the electro-optical device according to the exemplary embodiment.

The electro-optical device 10 displays a predetermined image in the display region E (refer to FIG. 4) by digital driving. Specifically, the light emitting element 20 (refer to FIG. 6) arranged in each sub-pixel 58 has a state of one of the binary values, namely, a light emission as a bright state and a non-light-emission as a dark state, and the gray scale of an image to be displayed depends on the ratio of a light emission period of the light emitting element 20. This is referred to as time-division driving.

FIG. 7 illustrates a field F as a frame period during which a single image is displayed. As illustrated in FIG. 7, in the time-division driving, a single field F during which a single image is displayed is divided into a plurality of sub-fields SF, and a light emission and a non-light-emission of the light emitting element 20 are controlled for each sub-field SF so that the gray scale is represented.

FIG. 8 illustrates a setting example of the time-division driving in the exemplary embodiment. Specifically, the upper rows in FIG. 8 indicate driving conditions such as a frame frequency f, one scan line selection period x, one vertical period VP, and a bit number g of gray scales. The middle rows in FIG. 8 indicate a length of a period of each sub-field SF on the right side. Herein, the period of SF is a sum of a non-display period P1 and a display period P2. The middle rows indicate a length of the non-display period P1 in each sub-field SF on the left side, and indicate a length of the display period P2 in each sub-field SF in the center. The lower rows in FIG. 8 indicate the number of display gray scales and the total number of emission colors.

As indicated by the upper rows in FIG. 8, as one example herein, when an image is displayed in a progressive scanning system with a frame frequency f of 60 Hz, one frame period 1/f=1 field F=16.67 milliseconds (msec). A case where a 16-bit time-division gray scale system performs display in $2^{16}$=65536 gray scales (refer to the lower rows in FIG. 8) with the bit number g of gray scales of 16 is described as an example. In the 16-bit time-division gray scale system, the single field F is divided into 16 sub-fields, namely SF1 to SF16.

In FIG. 7, the i-th sub-field in the single field F is indicated by SFi, and 16 sub-fields including the first sub-field SF1 to the sixteenth sub-field SF16 are illustrated. Each sub-field SF includes the display period P2 indicated by P2-1 to P2-16 as a second period and the non-display period P1 indicated by P1-1 to P1-16 as a first period.

In this specification, the sub-fields SF1 to SF16 may not be distinguished from one another and may be collectively referred to as a sub-field SF; the non-display periods P1-1 to P1-16 may not be distinguished from one another and may be collectively referred to as a non-display period P1; and the display periods P2-1 to P2-16 may not be distinguished from one another and may be collectively referred to as a display period P2.

The non-display period P1 includes one scan line selection period x being a period during which an image signal is written or rewritten to the memory circuit 60 (refer to FIG. 9) of the corresponding sub-pixel 58 when one scan line 42 is selected and a lights-out period during which the light emitting element 20 is in the non-light-emission. The one vertical period within which selection of each of the plurality of scan lines 42 is completed is VP. Given that the one scan line selection period x is 0.5 microseconds (psec) as indicated by the upper row in FIG. 8, the one vertical period VP is VP=$0.5 \times 10^{-3} \times 720$=0.36 milliseconds in the exemplary embodiment.

The light emitting element 20 is in light emission or non-light-emission during the display period P2 while it is in non-light-emission during the non-display period P1. In the exemplary embodiment, a length of the display period P2 (second period P2-1) in the sub-field SF1 as a first sub-field is different from a length of the display period P2 (second period P2-2) in the sub-field SF2 as a second sub-field. Specifically, the length of the display period P2 (second period P2-2) in the sub-field SF2 is twice the length of the display period P2 (second period P2-1) in the sub-field SF1. Likewise, a length of the display period P2 (second period P2-i) in a sub-field SFi is twice a length of the display period P2 (second period P2-i-1) in a previous sub-field SFi-1. Furthermore, a length of the non-display period P1 (second period P1-1) in the sub-field SF1 as the first sub-field is different from a length of the non-display period P1 (second period P1-2) in the sub-field SF2 as the second sub-field. A period length of the sub-field SF1 as the first sub-field, namely, a sum of the length of the non-display period P1 (first period P1-1) and the length of the display period P2 (second period P2-1) is equal to a period length of the sub-field SF2 as the second sub-field, namely, a sum of the length of the non-display period P1 (first period P1-2) and the length of the display period P2 (second period P2-2). Both of the period lengths are the one vertical period VP. As a result, the length of the non-display period P1 (first period P1-1) in the sub-field SF1 is longer than the length of the non-display period P1 (first period P1-2) in the sub-field SF2. In this way, the non-display period P1 is used for writing an image signal to the memory circuit 60 and adjusting display time.

When an image is displayed by the 16-bit time-division gray scale system in the progressive scanning system with a frame frequency of 60 Hz, P2-1 in the sub-field SF1 is 0.0002 milliseconds (=0.2 microseconds) as indicated by the middle row in FIG. 8. Then, the display period P2 in each sub-field SF is set to (P2-1 in SF1):(P2-2 in SF2):(P2-3 in SF3):(P2-4 in SF4):(P2-5 in SF5):(P2-6 in SF6)=1:2:4:8:16: 32. Subsequently, the display period P2 in an n+1-th (where n is an integer of 1 or greater) sub-field SF is set to be twice the display period P2 in an n-th sub-field SF. A total emittable period in 1 frame period is a total of P2-1 in SF1 to P2-16 in SF16, which is 13.114 milliseconds.

In the exemplary embodiment, the display period P2 (second period P2-1) in the sub-field SF1 as the first sub-field is shorter than the one vertical period VP from a time at which a certain scan line 42 starts to be selected in the sub-field SF1 to a time at which the same scan line 42 (the scan line 42 in the first row in this example) starts to be selected in the subsequent sub-field SF2. For example, the display period P2 (second period P2-1) in the sub-field SF1 as the first sub-field is shorter than a period from a time at which the scan line 42 in the first row starts to be selected in the sub-field SF1 to a time at which the same scan line 42 in the first row starts to be selected in the subsequent sub-field SF2, namely, the one vertical period VP. Thus, the number of display gray scales by the time-division driving can be easily increased by setting the display period P2 (second period) during which the light emitting element 20 is allowed to emit light to be an extremely short time. In this way, a high-quality image can be achieved.

When the sub-field SF16 as the second sub-field is selected, the display period P2 (second period P2-16) in the sub-field SF16 is longer than the one vertical period VP. Thus, the number of display gray scales by the time-division driving can be easily increased by setting the display period P2 (second period) during which the light emitting element 20 is allowed to emit light to be a relatively long time. In this way, a high-quality image can be achieved.

The display period P2 up to the sub-field SF11 is shorter than the one vertical period VP as indicated by the middle rows in FIG. 8, and thus each of an SF1 period to an SF11 period is 0.36 milliseconds, which is the same as the one vertical period VP. Therefore, each sub-field SF in the SF1 period to the SF11 period has the lights-out period. The display period P2 after the sub-field SF12 is longer than the one vertical period VP, and thus a period of each sub-field SF (each of SF12 period to SF16 period) is a sum of each of the display periods P2 (display period P2-12 to display period P2-16) and the one scan line selection period x. In this way, as indicated by the middle rows in FIG. 8, the SF12 period is 0.41 milliseconds, the SF13 period is 0.82 milliseconds, the SF14 period is 1.64 milliseconds, the SF15 period is 3.28 milliseconds, and the SF16 period is 6.56 milliseconds.

FIG. 7 illustrates the non-display period P1 and the display period P2 in each sub-field SF. Note that, FIG. 7 does not illustrate the display periods P2 (display period P2-1 to display period P2-8) because the display periods P2 in the sub-field SF1 to the sub-field SF8 are shorter than those in the sub-fields SF after the sub-field SF8. Also, FIG. 7 does not illustrate the non-display periods P1 (non-display periods P1-12 to P1-16) because the non-display periods P1 in the sub-fields SF after SF11 are shorter than those before sub-fields SF12. In other words, the one scan line selection period x is 0.5 microseconds and extremely short, which is thus not illustrated.

The digital driving by the 16-bit time-division gray scale system in the electro-optical device 10 can achieve display in 65536 gray scales based on the ratio of sum of the light emission periods to the total display periods P2 in the single field F. For example, for black display corresponding to a gray scale "0", the light emitting element 20 is in the non-light-emission during all of the display periods P2-1 to P2-16 in the 16 sub-fields SF1 to SF16. On the other hand, for white display corresponding to a gray scale "65535", the light emitting element 20 is in the light emission during all of the display periods P2-1 to P2-16 in the 16 sub-fields SF1 to SF16.

To obtain display with an intermediate luminance corresponding to, for example, a gray scale "7" of the 65536 gray scales, the light emitting element 20 is in the light emission during the display period P2-1 in the first sub-field SF1, the display period P2-2 in the second sub-field SF2, and the display period P2-3 in the third sub-field SF3, while the light emitting element 20 is in the non-light-emission during the display periods P2-4 to P2-16 in the other sub-fields SF4 to SF16. In this way, the light emitting element 20 may be selected to be in the light emission or the non-light-emission as appropriate for each of the sub-fields SF constituting the single field F to display an intermediate gray scale. Therefore, the number of emissionable colors, namely, the total number of emission colors is 281474976710656 colors as indicated by the lower row in FIG. 8.

Known analog-driven organic EL devices, which are electro-optical devices, display a gray scale analog-controlling the current flowing through the organic EL elements. The current depends on the gate potential of driving transistors. This causes variation in brightness as well as gray scale shift among pixels due to variation in the current-voltage characteristics and the threshold voltage of the driving transistor, thus resulting in a low display quality. To overcome this problem, when a compensating circuit is provided that compensates for the variation in the current-voltage characteristics and the threshold voltage of driving transistors as described in JP-A-2002-287695, an additional current needs to flow through the compensating circuit, thus increasing power consumption.

Furthermore, to achieve multiple gray scales of display, known organic EL devices require a capacitive element with large capacitance to store analog image signals. This requirement is incompatible with the requirements for high resolution, namely fine pixels, and has also resulted in a large power consumption due to charging and discharging of the capacitive element with large capacitance. In other words, it is difficult to achieve an electro-optical device that displays a high-quality image having a high resolution and multiple gray scales at a low power consumption by using any of known organic EL devices.

Since the electro-optical device 10 according to the exemplary embodiment is digitally driven, using binary system of ON-state and OFF-state, the light emitting element 20 is in one of the binary states, namely, a light emission and a non-light-emission. Accordingly, the electro-optical device 10 is less susceptible to the variation in the current-voltage characteristics and the threshold voltage of each transistor as compared to those based analog driving. As a result, the electro-optical device 10 reduces variation in brightness and decreases shift in gray scale among the pixels 59, namely, the sub-pixels 58 to display a high-quality image. Furthermore, since the digital driving eliminates the requirement for a capacitive element with a large capacitance, which is required in analog driving, it helps to achieve fine pixels 59, namely, fine sub-pixels 58 and a higher resolution and decreases the power consumption associated with charging and discharging of the large capacitive element.

Moreover, according to the digital driving in the electro-optical device 10, the number of gray scales can be easily increased or decreased by increasing or reducing the number of sub-fields SF constituting a single field F, namely, the bit number g of gray scales. As described later, in the digital driving in the electro-optical device 10, the non-display period P1 as a first period can serve as a signal write period during which an image signal is written to the memory circuit 60 or a signal rewrite period during which an image signal is rewritten. Accordingly, 16-bit gray-scale display can be easily converted to, for example, 8-bit gray-scale display and the like without changing the signal write period. In other words, 16-bit gray-scale display can be easily converted to 8-bit gray-scale display and the like without changing the clock frequency of the drive circuit 51.

Furthermore, in the digital driving in the electro-optical device 10, the image signal stored in the memory circuit 60 (refer to FIG. 9) will be rewritten between the sub-fields SF or between the fields F, only in a case where the memory circuit 60 is in the sub-pixel 58 that is to be changed. In other words, the image signal stored in the memory circuit 60 of the sub-pixel 58, which is not to be changed, will not be rewritten, in other word, the image signal will be kept. As a result, the power consumption can be reduced. Thus, this configuration can achieve the electro-optical device 10 that displays an image having multiple gray scales and a high resolution as well as a less variation in brightness and a small shift in gray scale among the pixels 59, namely, the sub-pixels 58 while reducing energy consumption.

Configuration of Pixel Circuit

Figure 9:
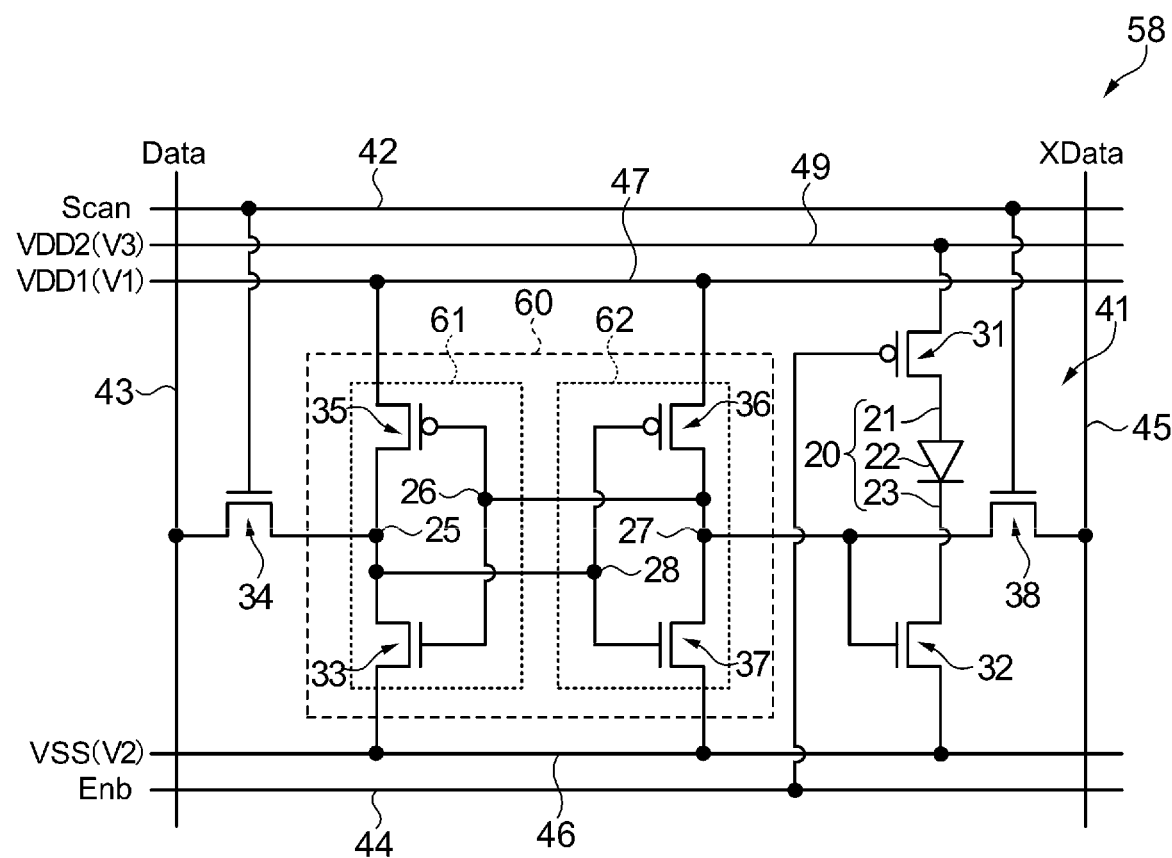
FIG. 9 illustrates a configuration of a pixel circuit according to the exemplary embodiment.

A configuration of a pixel circuit according to the exemplary embodiment will now be described with reference to FIG. 9. FIG. 9 illustrates a diagram illustrating the configuration of the pixel circuit according to the exemplary embodiment.

As illustrated in FIG. 9, a pixel circuit 41 is provided for each of the sub-pixels 58 that are arranged to correspond to the respective intersections of the scan lines 42 and the data lines 43. The enable line 44 is arranged along the scan line 42 whereas the complementary data line 45 is arranged along the data line 43. The scan line 42, the data line 43, the enable line 44, and the complementary data line 45 correspond to each pixel circuit 41.

In the exemplary embodiment, to each pixel circuit 41, the first potential VDD1 is supplied from the high potential line 47, the second potential VSS is supplied from the low potential line 46, and the third potential VDD2 is supplied from the high potential line 49.

The pixel circuit 41 according to the exemplary embodiment includes a P-type first transistor 31, the light emitting element 20, an N-type second transistor 32, the memory circuit 60, an N-type fourth transistor 34, and an N-type eighth transistor 38 as a complementary transistor of the fourth transistor 34. The pixel circuit 41 includes the memory circuit 60, such that the electro-optical device 10 can digitally drive the circuits and can make it possible to reduce the variation in display among the pixels 59 because variation in brightness of light emission of the light emitting element 20 among the sub-pixels 58 can be reduced, as compared to the case of analog driving.

The first transistor 31, the light emitting element 20, and the second transistor 32 are arranged in series between the third potential line (high potential line 49) and the second potential line (low potential line 46). The memory circuit 60 is arranged between the first potential line (high potential line 47) and the second potential line (low potential line 46). The fourth transistor 34 is arranged between the memory circuit 60 and the data line 43. The eighth transistor 38 is arranged between the memory circuit 60 and the complementary data line 45.

The memory circuit 60 includes a first inverter 61 and a second inverter 62. The memory circuit 60 includes the two inverters 61 and 62 electrically connected together in a circle to form a so-called static memory to store a digital signal, which is an image signal. An output terminal 25 of the first inverter 61 is electrically connected to an input terminal 28 of the second inverter 62, and an output terminal 27 of the second inverter 62 is electrically connected to an input terminal 26 of the first inverter 61.

In this specification, the state where a terminal A and a terminal B are electrically connected to each other means a state where the logic of the terminal A and the logic of the terminal B can be equal. For example, even when a transistor, a resistor, a diode, and the like are arranged between the terminal A and the terminal B, the terminals will be regarded as a state of electrically coupling, in a case where the logic of terminal A is the same as the logic of terminal B. Further, "arrange" as used in the expression "a transistor and an element are arranged between A and B" does not mean how they are arranged on a lay-out, but means how they are arranged in a circuit diagram.

A digital signal stored in the memory circuit 60 has one of the binary potentials of High and Low. In the exemplary embodiment, when the potential of the output terminal 25 of the first inverter 61 is Low, the potential of the output terminal 27 of the second inverter 62 is High and the light emitting element 20 is turned into a state of being allowed to emit light. When the potential of the output terminal 25 of the first inverter 61 is High, the potential of the output terminal 27 of the second inverter 62 is Low and the light emitting element 20 is turned into a non-light-emission.

In the exemplary embodiment, the two inverters 61 and 62 which constitute the memory circuit 60 are arranged between the first potential line (high potential line 47) and the second potential line (low potential line 46), and VDD1 serving as the first potential and VSS serving as the second potential are supplied to the two inverters 61 and 62. Accordingly, High corresponds to the first potential VDD1, and Low corresponds to the second potential VSS.

When a digital signal is stored in the memory circuit 60 and the potential of the output terminal 25 of the first inverter 61 is turned into Low, for example, Low is input to the input terminal 28 of the second inverter 62 to turn the potential of the output terminal 27 of the second inverter 62 to High. Then, High is input to the input terminal 26 of the first inverter 61 to turn the potential of the output terminal 25 of the first inverter 61 to Low. In this way, the digital signal stored in the memory circuit 60 is maintained in a stable state until it is rewritten next time.

The first inverter 61 includes an N-type third transistor 33 and a P-type fifth transistor 35. These two transistors constitute CMOS configuration. The third transistor 33 and the fifth transistor 35 are arranged in series between the first potential line (high potential line 47) and the second potential line (low potential line 46). The source of the third transistor 33 is electrically connected to the second potential line (low potential line 46). The source of the fifth transistor 35 is electrically connected to the first potential line (high potential line 47).

The second inverter 62 includes a P-type sixth transistor 36 and an N-type seventh transistor 37. These two transistors constitute CMOS configuration. The sixth transistor 36 and the seventh transistor 37 are arranged in series between the first potential line (high potential line 47) and the second potential line (low potential line 46). The source of the sixth transistor 36 is electrically connected to the first potential line (high potential line 47). The source of the seventh transistor 37 is electrically connected to the second potential line (low potential line 46).

The output terminal 25 of the first inverter 61 is formed by the drains of the third transistor 33 and the fifth transistor 35. The output terminal 27 of the second inverter 62 is formed by the drains of the sixth transistor 36 and the seventh transistor 37. The input terminal 26 of the first inverter 61 is formed by the gates of the third transistor 33 and the fifth transistor 35. The input terminal 26 is electrically connected to the output terminal 27 of the second inverter 62. Likewise, the input terminal 28 of the second inverter 62 is formed by the gates of the sixth transistor 36 and the seventh transistor 37. The input terminal 28 is electrically connected to the output terminal 25 of the first inverter 61.

In the exemplary embodiment, the first inverter 61 and the second inverter 62 each constitute CMOS configuration. However, the inverters 61 and 62 may include transistors and resistors. For example, one of the third transistor 33 and the fifth transistor 35 in the first inverter 61 may be replaced by a resistor, and one of the sixth transistor 36 and the seventh transistor 37 in the second inverter 62 may be replaced by a resistor.

In one embodiment, the light emitting element 20 is an organic EL element and includes an anode 21 that is a pixel electrode, a light emitting section 22 that is a light emitting functional layer, and a cathode 23 that is a counter electrode. The light emitting section 22 emits light when a positive hole injected from the anode 21 side and an electron injected from the cathode 23 side together form an exciton, which emits part of its energy as fluorescence or phosphorescence as it disappears (as the positive hole and the electron recombine).

In the pixel circuit 41 according to the exemplary embodiment, the light emitting element 20 is arranged between the first transistor 31 and the second transistor 32. The anode 21 of the light emitting element 20 is electrically connected to the drain of the first transistor 31 while the cathode 23 of the light emitting element 20 is electrically connected to the drain of the second transistor 32.

The second transistor 32 is a drive transistor for the light emitting element 20. Thus, once the second transistor 32 is turned in an ON-state, the light emitting element 20 is allowed to emit light. The gate of the second transistor 32 is electrically connected to the output terminal 27 of the second inverter 62 of the memory circuit 60. The source of the second transistor 32 is electrically connected to the second potential line (low potential line 46). The drain of the second transistor 32 is electrically connected to the cathode 23 of the light emitting element 20. In other words, the N-type second transistor 32 is arranged on the low potential side with respect to the light emitting element 20.

The first transistor 31 is a control transistor serving as a control circuit that controls light emission of the light emitting element 20. While the first transistor 31 is in the ON-state, the light emitting element 20 is allowed to emit light. As described later, in the exemplary embodiment, the light emitting element 20 emits light when the first transistor 31 is placed into the ON-state by the active signal supplied as an enable signal to the enable line 44, the output terminal 27 of the second inverter 62 becomes the potential corresponding to light emission, and the second transistor 32 is turned into the ON-state.

The gate of the first transistor 31 is electrically connected to the enable line 44. The source of the first transistor 31 is electrically connected to the third potential line (high potential line 49). The drain of the first transistor 31 is electrically connected to the anode 21 of the light emitting element 20. In other words, the P-type first transistor 31 is arranged on the high potential side with respect to the light emitting element 20.

Herein, for an N-type transistor, the source is defined so that the source potential is lower than the drain potential. On the other hand, for a P-type transistor, the source is defined so that the source potential is higher than the drain potential. An N-type transistor is arranged on the lower potential side than is the light emitting element 20. On the other hand, a P-type transistor is arranged on the higher potential side than is the light emitting element 20. This arrangement of the N-type transistor and the P-type transistor with respect to the light emitting element 20 makes each transistor operate substantially in linear region. Hereinafter, operating a transistor substantially in linear region is simply referred to as linear operation.

The first transistor 31 and the second transistor 32 are preferably different conductive types from each other. In the exemplary embodiment, the first transistor 31 is the P-type and the second transistor 32 is the N-type. The P-type first transistor 31 is arranged on the high potential side with respect to the light emitting element 20, and the N-type second transistor 32 is arranged on the low potential side with respect to the light emitting element 20. Accordingly, the first transistor 31 and the second transistor 32 can be linearly operated. As a result, the variation in the threshold voltage of the first transistor 31 and the second transistor 32 will not affect the display characteristics (brightness of light emission of the light emitting element 20).

Then, the source of the first transistor 31 is electrically connected to the third potential line (high potential line 49) while the source of the second transistor 32 is electrically connected to the second potential line (low potential line 46). Thus, the source potential of the first transistor 31 is fixed at the third potential, and the source potential of the second transistor 32 is fixed at the second potential. In this way, even with a small source-drain voltage of the first transistor 31 and the second transistor 32, electrical conductivity of the first transistor 31 and the second transistor 32 can be increased. As a result, most of the potential difference between the third potential VDD2 and the second potential VSS is applied to the light emitting element 20. Thus, the variation in the threshold voltage of the first transistor 31 and the second transistor 32 tends to have a smaller influence, and uniformity of brightness of light emission of the light emitting element 20 can be improved among the pixels 59, namely, the sub-pixels 58.

The fourth transistor 34 is arranged between the input terminal 28 of the second inverter 62 constituting the memory circuit 60 and the data line 43. One of the source and the drain of the N-type fourth transistor 34 is electrically connected to the data line 43, while the other is electrically connected to the input terminal 28 of the second inverter 62 constituting the memory circuit 60, namely, the gates of the sixth transistor 36 and the seventh transistor 37, and is also electrically connected to the drains of the third transistor 33 and the fifth transistor 35. The gate of the fourth transistor 34 is electrically connected to the scan line 42.

The eighth transistor 38 is arranged between the input terminal 26 of the first inverter 61 constituting the memory circuit 60 and the complementary data line 45. One of the source and the drain of the N-type eighth transistor 38 is electrically connected to the complementary data line 45, while the other is electrically connected to the input terminal 26 of the first inverter 61 constituting the memory circuit 60, namely, the gates of the third transistor 33 and the fifth transistor 35, and is also electrically connected to the drains of the sixth transistor 36 and the seventh transistor 37. The gate of the eighth transistor 38 is electrically connected to the scan line 42.

The electro-optical device 10 according to the exemplary embodiment includes a plurality of complementary data lines 45 in the display region E (refer to FIG. 5). One data line 43 and one complementary data line 45 correspond to one pixel circuit 41. Signals that are complementary to each other are supplied to a pair of the data line 43 and its complementary data line 45, both of which corresponds to a pixel circuit 41. In other words, a signal with an inverted polarity relative to the signal supplied to the data line 43 is supplied to the corresponding complementary data line 45. Hereinafter, the signal with an inverted polarity is referred to as an inverted signal. When High is supplied to the data line 43, for example, Low is supplied to its paired complementary data line 45. When Low is supplied to the data line 43, High is supplied to its paired complementary data line 45.

Each of the fourth transistor 34 and the eighth transistor 38 is a selecting transistor for the pixel circuit 41. The gate of the fourth transistor 34 and the gate of the eighth transistor 38 are electrically connected to the scan line 42. The fourth transistor 34 and the eighth transistor 38 are simultaneously switchable between an ON-state and an OFF-state depending on the selection signal and the non-selection signal, which are the scan signals supplied to the scan line 42.

When the selection signal is supplied as the scan signal to the scan line 42, the fourth transistor 34 and the eighth transistor 38 are selected and both turned into the ON-state. As a result, the data line 43 and the input terminal 28 of the second inverter 62 of the memory circuit 60 are brought into electrical communications, and at the same time, the complementary data line 45 and the input terminal 26 of the first inverter 61 of the memory circuit 60 are brought into electrical communications.

In this way, a digital image signal is written to the input terminal 28 of the second inverter 62 from the data line 43 through the fourth transistor 34. A digital complementary image signal as an inverted signal relative to the digital image signal is also written to the input terminal 26 of the first inverter 61 from the complementary data line 45 through the eighth transistor 38. As a result, the digital image signal and the digital complementary image signal are stored in the memory circuit 60.

The digital image signal and the digital complementary image signal stored in the memory circuit 60 are maintained in a stable state until the fourth transistor 34 and the eighth transistor 38 are next selected and turned into the ON-state, and subsequently the digital image signal and the digital complementary image signal are newly written from the data line 43 and the complementary data line 45, respectively.

To reduce the ON-resistance of the fourth transistor 34 to be lower than the ON-resistance of the third transistor 33 and the ON-resistance of the fifth transistor 35, the polarity, dimensions (gate length, gate width, and the like), driving conditions (potential when the scan signal is the selection signal), and the like of each of the transistors are preferably designated. Likewise, to reduce the ON-resistance of the eighth transistor 38 to be lower than the ON-resistance of the sixth transistor 36 and the ON-resistance of the seventh transistor 37, the polarity, dimensions, driving conditions, and the like of each of the transistors are preferably designated. This allows the signal stored in the memory circuit 60 to be rewritten quickly and reliably.

The electro-optical device 10 according to the exemplary embodiment also includes a plurality of enable lines 44 in the display region E. The gate of the first transistor 31 is electrically connected to the enable line 44. The first transistor 31 as a control transistor for the light emitting element 20 is switchable between an ON-state and an OFF-state depending on the active signal or the inactive signal, which are the enable signals supplied to the enable line 44.

When the active signal is supplied as the enable signal to the enable line 44, the first transistor 31 is turned into the ON-state. While the first transistor 31 is in the ON-state, the light emitting element 20 is allowed to emit light. On the other hand, when the inactive signal is supplied as the enable signal to the enable line 44, the first transistor 31 is turned into the OFF-state and the light emitting element 20 is turned into the non-light-emission. While the first transistor 31 is in the OFF-state, the memory circuit 60 is allowed to rewrite the stored image signal without false operation. This is described below.

In the exemplary embodiment, since the enable line 44 and the scan line 42 are independent from each other for each pixel circuit 41, the first transistor 31 and the fourth transistor 34 can operate independently from each other. As a result, the first transistor 31 can be always in the OFF-state when the fourth transistor 34 is turned into the ON-state.

In other words, for an image signal being written to the memory circuit 60, after the first transistor 31 is turned into the OFF-state, the fourth transistor 34 and the eighth transistor 38 are then turned into the ON-state to supply the image signal and the inverted signal relative to the image signal to the memory circuit 60. While the fourth transistor 34 is in the ON-state, the first transistor 31 is in the OFF-state. As a result, the light emitting element 20 does not emit light while the image signal is being written to the memory circuit 60. In this way, gray scales by time division can be accurately expressed.

Subsequently to cause the light emitting element 20 to emit light, after the fourth transistor 34 and the eighth transistor 38 are turned into the OFF-state, the first transistor 31 is then turned into the ON-state. In a case where the second transistor 32 is in the ON-state at this time, the path that leads from the third potential line (high potential line 49) to the second potential line (low potential line 46) through the first transistor 31, the light emitting element 20, and the second transistor 32 can be electrically conducted, and thus a current flows to the light emitting element 20.

The image signal and the inverted signal relative to the image signal are not supplied to the memory circuit 60 while the light emitting element 20 are emitting light. This is because the fourth transistor 34 and the eighth transistor 38 are in the OFF-state during the first transistor 31 being in the ON-state. This ensures that the image signal stored in the memory circuit 60 is not erroneously rewritten. As a result, a high-quality image without any display errors can be achieved.

Relationship Between Each Potential and Threshold Voltage of Transistor

As described above, in the exemplary embodiment, the first potential VDD1 and the second potential VSS constitute a low-voltage power supply, and the third potential VDD2 and the second potential VSS constitute a high-voltage power supply. With such a configuration, the electro-optical device 10 that operates at a high speed and achieves bright display can be achieved. This is described below.

In the following description, the first potential, the second potential, and the third potential are represented as V1, V2, and V3, respectively. In the exemplary embodiment, a potential difference (V1−V2=3.0 V) between the first potential (V1=3.0 V as one example) and the second potential (V2=0 V as one example) as voltages of the low-voltage power supply is smaller than a potential difference (V3−V2=7.0 V) between the third potential (V3=7.0 V as one example) and the second potential (V2=0 V) as voltages of the high-voltage power supply (V1−V2<V3−V2).

By setting each of the potentials as described above, the low-voltage power supply supplied with the first potential and the second potential causes the drive circuit 51 and the memory circuit 60 to operate. Thus, fine transistors constituting the drive circuit 51 and the memory circuit 60 can be achieved, and the drive circuit 51 and the memory circuit 60 can operate at a high speed. On the other hand, the high-voltage power supply supplied with the third potential and the second potential causes the light emitting element 20 to emit light, and thus brightness of light emission of the light emitting element 20 can be increased. In other words, with the configuration in the exemplary embodiment, the electro-optical device 10 in which bright display is acquired by the light emitting element 20 emitting light at high brightness while each circuit operates at a high speed can be achieved.

A light emitting element such as an organic EL element typically requires a relatively high-voltage (for example, 5 V or higher) to cause the light emitting element to emit light. However, in a semiconductor device such as the memory circuit 60, when a power-supply voltage is increased, the size of a transistor, which includes a gate length L and a gate width W, inevitably needs to be increased to prevent false operation, thus resulting in a slow operation of the circuit. On the other hand, when a power-supply voltage is reduced to operate the circuit at a high speed, brightness of light emission of the light emitting element decreases. That is, in the known configuration in which the power-supply voltage for causing the light emitting element to emit light is the same as the power-supply voltage for causing the circuit to operate, light emission of the light emitting element at high brightness is incompatible with a high-speed operation of the circuit.

In contrast, the low-voltage power supply and the high-voltage power supply are provided as power supplies of the electro-optical device 10 in the exemplary embodiment, and a power supply that causes the drive circuit 51 and the memory circuit 60 to operate is the low-voltage power supply. Accordingly, the size of each of transistors constituting the drive circuit 51 and the memory circuit 60 is set to L=0.5 micrometers (μm) approximately, which is smaller than L=0.75 micrometers (μm) approximately of the first transistor 31 and the second transistor 32 to drive these circuits at a low-voltage of V1−V2=3.0 V. Thus, the drive circuit 51 and the memory circuit 60 can operate at a high speed.

Then, the high-voltage power supply causes the light emitting element 20 to emit light at a high-voltage of V3−V2=7.0 V, and thus the light emitting element 20 can emit light at high brightness. Furthermore, as described later, the first transistor 31 and the second transistor 32 arranged in series with the light emitting element 20 are linearly operated, so that most of the high-voltage of V3−V2=7.0 V can be applied to the light emitting element 20. Accordingly, brightness when the light emitting element 20 emits light can be further increased.

In the exemplary embodiment, a threshold voltage ($V_{th2}$) of the second transistor 32 as a driving transistor is positive ($0<V_{th2}$). When the image signal stored in the memory circuit 60 corresponds to non-light-emission, the potential of the output terminal 27 of the memory circuit 60 is Low, namely, the second potential V2. Since the source of the second transistor 32 is electrically connected to the second potential line (low potential line 46), both of the source potential and the gate potential of the second transistor 32 are the second potential V2, and thus a gate-source voltage $V_{gs2}$ of the second transistor 32 is 0 V.

Therefore, when the threshold voltage $V_{th2}$ ($V_{th2}$=0.36 V as one example) of the second transistor 32 is positive ($0<V_{th2}$), the gate-source voltage $V_{gs2}$ of the N-type second transistor 32 is smaller than the threshold voltage $V_{th2}$, and the second transistor 32 is then turned into the OFF-state. In this way, when the image signal corresponds to non-light-emission, the second transistor 32 can be reliably turned into the OFF-state.

In the exemplary embodiment, the potential difference between the first potential V1 and the second potential V2 is greater than the threshold voltage $V_{th2}$ of the second transistor ($V_{th2}<$V1−V2). When the image signal stored in the memory circuit 60 corresponds to light emission, the potential of the output terminal 27 of the memory circuit 60 is High. High is the first potential V1, and thus the gate-source voltage $V_{gs2}$ of the second transistor 32 is the potential difference ($V_{gs2}$=V1−V2=3.0 V−0 V=3.0 V) between the first potential V1 and the second potential V2.

With the potential difference (V1−V2=3.0 V) between the first potential V1 and the second potential V2 being greater than the threshold voltage $V_{th2}$ ($V_{th2}$=0.36 V) of the second transistor 32 ($V_{th2}<$V1−V2), the gate-source voltage $V_{gs2}$ of the N-type second transistor 32 is greater than the threshold voltage $V_{th2}$ when the potential of the output terminal 27 of the memory circuit 60 is High. Accordingly, the second transistor 32 is turned into the ON-state. Therefore, when the image signal corresponds to light emission, the second transistor 32 can be reliably turned into the ON-state.

The first transistor 31 as a control transistor is turned into the OFF-state by the inactive signal supplied as an enable signal from the enable line 44 electrically connected to the gate, and is turned into the ON-state by the active signal supplied as an enable signal from the enable line 44. Since the first transistor 31 is the P-type in the exemplary embodiment, the inactive signal is set to be a high potential higher than or equal to the third potential V3 and is preferably the third potential V3 as described above. The active signal is set to be a low potential lower than or equal to V3−(V1−V2) and is preferably the second potential V2.

When the inactive signal at the third potential V3 is supplied from the enable line 44 to the gate of the first transistor 31, both of the source potential and the gate potential of the first transistor 31 become the third potential V3, and thus a gate-source voltage $V_{gs1}$ of the first transistor 31 becomes 0 V. With a threshold voltage $V_{th1}$ ($V_{th1}$=−0.36 V as one example) of the P-type first transistor 31, the gate-source voltage $V_{gs1}$ of the fourth transistor 34 is greater than the threshold voltage $V_{th1}$, and the first transistor 31 is then turned into the OFF-state. Therefore, when the enable signal is the inactive signal, the first transistor 31 can be reliably turned into the OFF-state.

When the active signal at a potential lower than or equal to V3−(V1−V2), that is, a potential lower than or equal to 7.0 V−(3.0 V−0 V)=4.0 V is supplied from the enable line 44, the gate-source voltage $V_{gs1}$ of the first transistor 31 becomes less than or equal to 4.0-7.0 V=−3.0 V. Therefore, the gate-source voltage $V_{gs1}$ of the first transistor 31 is sufficiently smaller than the threshold voltage $V_{th1}$, the first transistor 31 can be reliably turned into the ON-state with the active signal as an enable signal.

As the potential of the active signal decreases, the gate-source voltage $V_{gs1}$ of the first transistor 31 increases. With the potential of the active signal as the second potential V2, the gate-source voltage $V_{gs1}$ of the first transistor 31 becomes 0 V−7.0 V=−7.0 V, and thus the ON-resistance of the first transistor 31 in the ON-state decreases. Accordingly, the variation in the threshold voltage of the first transistor 31 tends to have a smaller influence when the light emitting element 20 emits light.

Among the first potential, the second potential, and the third potential as three known potentials, the highest third potential V3 is set to be the potential of the inactive signal, and the lowest second potential V2 is set to be the potential of the active signal, and thus the potentials of the inactive signal and the active signal can be set without providing a new potential (potential line). An absolute value of the gate-source voltage of the first transistor 31 can be sufficiently increased by the active signal, so that the variation in the threshold voltage of the first transistor 31 will hardly affect brightness of light emission of the light emitting element by sufficiently reducing the ON-resistance of the first transistor 31 in the ON-state.

In other words, with the configuration in the exemplary embodiment, even when the two types of the electrical systems of the low-voltage power supply and the high-voltage power supply are used, the light emitting element 20 can be reliably turned into the non-light-emission when needing to be in the non-light-emission by turning the first transistor 31 and the second transistor 32 into the OFF-state, and the light emitting element 20 can be reliably turned into the light emission when needing to be in the light emission by turning the first transistor 31 and the second transistor 32 into the ON-state.

The fourth transistor 34 as a selection transistor is turned into the OFF-state by the non-selection signal supplied as a scan signal from the scan line 42 electrically connected to the gate, and is turned into the ON-state by the selection signal supplied as a scan signal from the scan line 42. Since the fourth transistor 34 is the N-type in the exemplary embodiment, the non-selection signal is set to be a low potential lower than or equal to the second potential V2 and is preferably the second potential V2 as described above.

The selection signal is set to be a high potential higher than or equal to the first potential V1 and is preferably the third potential V3.

The second transistor 32 and the fourth transistor 34 are preferably the same conductive type. In the exemplary embodiment, both of the second transistor 32 and the fourth transistor 34 are the N-type. Therefore, the second transistor 32 is in the ON-state when the potential of the image signal supplied to the gate is High, and the fourth transistor 34 is in the ON-state when the scan signal supplied to the gate is the selection signal (High). While High of the image signal is the first potential V1, the selection signal (High) is set to be higher than or equal to the first potential V1 and is preferably the third potential V3.

A case where the potential of the selection signal is the third potential V3 and the image signal in the memory circuit 60 is rewritten from Low to High will be described. The potential of the input terminal 28 of the second inverter 62 to which one of the source and the drain of the fourth transistor 34 is electrically connected is the second potential V2 of Low before the image signal is rewritten. When the selection signal at the third potential V3 is supplied from the scan line 42 to the gate of the fourth transistor 34, a gate-source voltage $V_{gs4}$ of the fourth transistor 34 becomes V3−V2=7.0 V−0 V=7.0 V and is higher than a threshold voltage $V_{th4}$ ($V_{th4}$=0.36 V as one example) of the fourth transistor 34. Accordingly, the fourth transistor 34 is turned into the ON-state.

While the potential of the output terminal 25 of the first inverter 61 gradually increases from Low (V2) to High (V1) by the image signal of High (V1) being written from the data line 43 to the memory circuit 60, the gate-source voltage $V_{gs4}$ of the fourth transistor 34 gradually decreases to V3−V1=7.0 V−3.0 V=4.0 V accordingly. Even when the gate-source voltage $V_{gs4}$ of the fourth transistor 34 becomes the lowest, which is 4.0 V, the gate-source voltage $V_{gs4}$ is sufficiently higher than the threshold voltage $V_{th4}$ of the fourth transistor 34. Thus, the ON-resistance of the fourth transistor 34 is maintained to be low until the image signal is written to the memory circuit 60, so that the image signal can be reliably written to the memory circuit 60.

Herein, it is assumed that the fourth transistor 34 is a P-type fourth transistor 34A having a different conductive type from that of the second transistor 32. In this case, the fourth transistor 34A is in the ON-state with the selection signal as Low. When the potential of the selection signal is set to be the second potential V2 and the image signal in the memory circuit 60 is rewritten from High to Low, the gate-source voltage $V_{gs4}$ of the fourth transistor 34A becomes V2−V1=0 V−3.0 V=−3.0 V by the selection signal at the second potential V2 supplied from the scan line 42, and becomes lower than the threshold voltage $V_{th4}$ ($V_{th4}$=−0.36 V as one example) of the fourth transistor 34A. Accordingly, the fourth transistor 34A is turned into the ON-state.

While the potential of the input terminal 28 of the second inverter 62 gradually decreases from High (V1) by the image signal of Low (V2) being written from the data line 43 to the memory circuit 60, the gate-source voltage $V_{gs4}$ of the fourth transistor 34A gradually increases from −3.0 V accordingly and reaches the threshold voltage $V_{th4}$ of the P-type fourth transistor 34A before the potential of the input terminal 28 becomes the second potential V2. Then, the fourth transistor 34A is turned into the OFF-state.

While the gate-source voltage $V_{gs4}$ increases and approaches the threshold voltage $V_{th4}$ before the fourth transistor 34A is turned into the OFF-state, the ON-resistance of the fourth transistor 34A increases. This may cause the rewriting of the image signal to the memory circuit 60 to take undesirably long time or failing of the rewriting. The potential of the selection signal may be set to be a lower potential to avoid this, but, in this case, a potential line having a different potential from an existing potential is further needed.

When both of the second transistor 32 and the fourth transistor 34 are the same conductive type, which is the N-type, as in the exemplary embodiment, the potential of the selection signal can be set without a new potential line by setting the potential of the selection signal to be the highest third potential between the third potential and the first potential. When the fourth transistor 34 is in the ON-state and the image signal is written to the memory circuit 60, the gate-source voltage $V_{gs4}$ of the fourth transistor 34 can be increased. Thus, even when the source potential increases due to writing of the image signal, the ON-resistance of the second transistor 32 can be maintained to be low. In this way, the image signal can be written or rewritten to the memory circuit 60 in a quick and reliable manner.

As a result, the relationship between each of the preferable potentials V1, V2, and V3 in the exemplary embodiment and the threshold voltage $V_{th2}$ of the second transistor 32 is represented by Equation (1) and Equation (2):

[Equation 1]

$$0 < Vth1 \qquad (1)$$

[Equation 2]

$$V2 + Vth1 < V1 < V3 \qquad (2)$$

Characteristics of Transistor

Next, characteristics of a transistor provided in the electro-optical device 10 according to the exemplary embodiment will be described. In the electro-optical device 10 according to the exemplary embodiment, the first transistor 31 and the second transistor 32 are arranged in series with the light emitting element 20 between the third potential line (high potential line 49) and the second potential line (low potential line 46) constituting the high-voltage power supply. It is preferable that the ON-resistance of the first transistor 31 is sufficiently lower than the ON-resistance of the light emitting element 20. It is also preferable that the ON-resistance of the second transistor 32 is sufficiently lower than the ON-resistance of the light emitting element 20.

The sufficiently lower ON-resistance means a driving condition that allows linear operation of the first transistor 31 and the second transistor 32. Specifically, the ON-resistance of the first transistor 31 and the second transistor 32 is one hundredth or less, and preferably, one thousandth or less of the ON-resistance of the light emitting element 20. Such characteristics enable the first transistor 31 and the second transistor 32 to linearly operate when the light emitting element 20 emits light.

As a result, most of the potential drop across the first transistor 31, the second transistor 32, and the light emitting element 20 that are arranged in series is applied to the light emitting element 20, resulting in a less susceptible state to variation in the threshold voltage of both the transistors 31 and 32 when the light emitting element 20 emits light. In other words, most of the potential difference between the third potential and the second potential, which are voltages of the high-voltage power supply, is applied to the light emitting element 20, resulting in a less susceptible state to variation in the threshold voltage of both the transistors 31 and 32 when the light emitting element 20 emits light. That is, such a configuration can reduce an influence of the variation in the threshold voltage of the first transistor 31 and the second transistor 32. Therefore, an image display having excellent uniformity with less variations in brightness and less shift in gray scales among the pixels 59, namely, the sub-pixels 58 can be achieved.

The reason is that 99% or greater of the power-supply voltage is applied to the light emitting element 20 by setting the ON-resistance of the first transistor 31 and the second transistor 32 to be one hundredth or less of the ON-resistance of the light emitting element 20, such that the potential drop in both the transistors 31 and 32 is 1% or less of the total power-supply voltage. The potential drop in both the transistors 31 and 32 is small, which is 1% or less, and thus the variation in the threshold voltage of both the transistors 31 and 33 tends to have a smaller influence on the characteristics of light emission of the light emitting element 20.

In the exemplary embodiment, the series resistance of the first transistor 31 and the second transistor 32 is about one thousandth of the ON-resistance of the light emitting element 20. In this case, about 99.9% of the power-supply voltage is applied to the light emitting element 20, such that the potential drop in both the transistors 31 and 32 is about 0.1%. Thus, influences of the variation in the threshold voltage of both the transistors 31 and 32 on the characteristics of light emission of the light emitting element 20 are almost negligible.

The ON-resistance of a transistor depends on the polarity, gate length, gate width, threshold voltage, thickness of the gate-insulating film, and the like of the transistor. In the exemplary embodiment, the polarity, gate length, gate width, threshold voltage, thickness of the gate-insulating film, and the like of both the transistors 31 and 32 are preferably designated to set the ON-resistance of the first transistor 31 and the second transistor 32 to be sufficiently lower than the ON-resistance of the light emitting element 20. This is described below.

In the exemplary embodiment, an organic EL element is used as the light emitting element 20, and the transistors that include the first transistor 31 and the second transistor 32 are formed on the element substrate 11, which is a single-crystal silicon substrate. The current-voltage characteristics of the light emitting element 20 are represented approximately by Equation (3).

[Equation 3]

$$I_{EL} = L_{EL} W_{EL} J_0 \left\{ \exp\left(\frac{V_{EL} - V_0}{V_{tm}}\right) - 1 \right\} \quad (3)$$

In Equation (3), $I_{EL}$ is a current flowing through the light emitting element 20, $V_{EL}$ is a voltage applied to the light emitting element 20, $L_{EL}$ is the length of the light emitting element 20 in the plan view, $W_{EL}$ is the width of the light emitting element 20 in the plan view, $J_0$ is the current density coefficient of the light emitting element 20, $V_{tm}$ is the coefficient voltage (constant voltage under a constant temperature) of the light emitting element 20 having a temperature dependence, and $V_0$ is a threshold voltage for light emission of the light emitting element 20. Herein, $V_{tm}$ is a constant voltage under a constant temperature.

Using the voltage $V_P$ of the high-voltage power supply and the potential drop $V_{ds}$ occurring in the first transistor 31 and the second transistor 32, the following voltage relation holds: $V_{EL} V_{ds} = V_P$. In the exemplary embodiment, the followings were provided: $L_{EL}$=11 micrometers (μm), $W_{EL}$=micrometers (μm), $J_0$=1.449 milliamperes per square centimeter (mA/cm²), $V_0$=3.0 volts (V), and $V_{tm}$=0.541 volt (V).

Provided that the first transistor 31 and the second transistor 32 are represented as an i-th transistor (i is 1 or 4), a drain current $I_{dsi}$ of the transistor is represented by Equation (4).

[Equation 4]

$$I_{dsi} = \frac{W_i}{L_i} \cdot \frac{\varepsilon_0 \varepsilon_{ox}}{t_{oxi}} \cdot \mu_i (V_{gsi} - V_{thi}) V_{dsi} \equiv Z_i (V_{gsi} - V_{thi}) V_{dsi} \quad (4)$$

In Equation (4), $W_i$ is the gate width of the i-th transistor, $L_i$ is the gate length of the i-th transistor, $\varepsilon_0$ is the permittivity of vacuum, $\varepsilon_{ox}$ is the permittivity of a gate insulating film, $t_{oxi}$ is the thickness of the gate insulating film, $\mu_i$ is the mobility of the i-th transistor, $V_{gsi}$ is the gate voltage, $V_{dsi}$ is the potential drop by the i-th transistor and the drain voltage, and $V_{thi}$ is the threshold voltage of the i-th transistor.

In Example 1, $W_1$=1.25 micrometers (μm), $W_2$=1.0 micrometers (μm), $L_1$=$L_2$=0.75 micrometers (μm), $t_{ox}$=20 nanometers (nm), $\mu_1$=150 square centimeters per volt per second (cm²/V·s), $\mu_2$=240 square centimeters per volt per second (cm²/V·s) $V_{th1}$=−0.36 V, $V_{th2}$=0.36 V, $V_{gs1}$=V2−V3=−7 V, and $V_{gs2}$=V1−V2=3.0 V.

Note that, when the first transistor 31 and the second transistor 32 operate linearly, the current-voltage characteristics of the light emitting element 20 at the voltage drop $V_{ds}$ in both the transistors 31 and 32 being in the vicinity of 0 V is approximated by Equation (5).

[Equation 5]

$$I_{EL} = -k V_{ds} + I_0 \quad (5)$$

In the exemplary embodiment, the coefficient k defined by Equation (5) is such that: k=1.39×10⁻⁶ Ω⁻¹. $I_0$ is the amount of current when all of the voltage $V_P$ of the high-voltage power supply is applied to the light emitting element 20, and $I_0$=7.82×10⁻⁷ A.

Under such conditions, a voltage for causing the light emitting element 20 to emit light is a voltage that satisfies $I_{EL}$=$I_{ds}$ using Equation (3) and Equation (5). In the exemplary embodiment, the followings were provided: $V_P$=V3−V2=7 V, $V_{ds1}$=0.0027 V, $V_{ds2}$=0.0053 V, $V_{EL}$=6.9920 V, and $I_{EL}$=$I_{ds1}$=$I_{ds2}$=7.672×10⁻⁷ A. At this time, the ON-resistance of the first transistor 31 was 3.491×10³ Ω, the ON-resistance of the second transistor 32 was 6.859×10³ Ω, and the ON-resistance of the light emitting element 20 was 9.113×10⁶ Ω.

Therefore, the ON-resistance of the first transistor 31 is about 1/2600 of the ON-resistance of the light emitting element 20. This value is smaller than one thousandth of the ON-resistance of the light emitting element 20. The ON-resistance of the second transistor 32 is about 1/1300 of the ON-resistance of the light emitting element 20. This value is smaller than one thousandth of the ON-resistance of the light emitting element 20. Thus, most of the voltage of the high-voltage power supply can be applied to the light emitting element 20.

Under such conditions, even when the threshold voltage of the transistor fluctuates to greater than or equal to 30%, the followings are invariable: $V_{EL}$=6.99 V, $I_{EL}=I_{ds1}=I_{ds2}$=7.67×10$^{-7}$ A. Specifically, even when $V_{th1}$ and $V_{th2}$ fluctuate within a range of 0.29 V to 0.53 V, $V_{EL}$ and $I_{EL}=I_{ds1}=I_{ds2}$ are invariable. Normally, the threshold voltage of the transistor does not vary as significantly as above. Therefore, by setting the ON-resistance of the first transistor 31 to be lower than or equal to about one thousandth of the ON-resistance of the light emitting element 20, the influences of the variation in the threshold voltage of the first transistor 31 and the second transistor 32 on brightness of light emission of the light emitting element 20 are substantially eliminated.

By simultaneously solving Equation (4) and Equation (5) with $I_{EL}=I_{dsi}$, the influences of the variation in the threshold voltage of the i-th transistor on the current $I_{EL}=I_{dsi}$ can be approximated by Equation (6).

[Equation 6]

$$\left(1 + \frac{k}{Z_i(V_{gsi} - V_{thi})}\right) I_{EL} = I_0 \quad (6)$$

Since $I_0$ is the amount of current when all of the voltage $V_P$ of the high-voltage power supply is applied to the light emitting element 20, Equation (6) indicates that the large value of the gate voltage $V_{gs1}$ and $Z_i$ causes the light emitting element 20 to emit light at around the power-supply voltage V. In other words, the larger the value of $Z_i$, the less brightness of light emission of the light emitting element 20 is affected by variation in the threshold voltage of the transistor.

Since $k/Z_1$=3.22×10$^{-2}$ V and $k/Z_2$=2.52×10$^{-2}$ V are small values in the exemplary embodiment, the second term on the left side of Equation 6 is $k/(Z_1 (V_{gs1}-V_{th1}))$=0.005 for the first transistor 31 and $k/(Z_2 (V_{gs2}-V_{th2}))$=0.01 for the second transistor 32, and is thus less than about 0.01 (1%). As a result, the current flowing through the light emitting element 20 for controlling brightness of light emission was hardly affected by the variation in the threshold voltage of both the transistors 31 and 32. In other words, setting a value of $k/(Z_i(V_{gsi}-V_{thi}))$ to less than about 0.01 (1%) makes brightness of light emission of the light emitting element 20 substantially independent from the variation in the threshold voltage ($V_{th1}$ and $V_{th2}$) of both the transistors 31 and 32.

In Equation (6), k and $Z_i$ are defined by Equation (4) and Equation (5). Note that, the mobility $\mu_i$ in the P-type transistor is smaller than that in the N-type transistor, and thus W of the P-type transistor is set to be greater than W of the N-type transistor. In the exemplary embodiment, $W_1$ of the P-type transistor is greater than $W_2$ of the N-type transistor, and $Z_1$ of the P-type first transistor 31 is substantially identical to $Z_2$ of the N-type second transistor 32.

The gate voltage $V_{gsi}$ is preferably as high as possible to cause the light emitting element 20 to emit light at around the power-supply voltage $V_P$. In the exemplary embodiment (Example 1), the gate-source voltage $V_{gs1}$ of the first transistor 31 is increased by setting the potential of the active signal as the enable signal in the active state to be the second potential V2 for the third potential V3 as the source potential of the first transistor 31.

In the electro-optical device 10 according to the exemplary embodiment, the third transistor 33 and the fifth transistor 35 constituting the first inverter 61 and the sixth transistor 36 and the seventh transistor 37 constituting the second inverter 62 included in the memory circuit 60 are arranged between the first potential line (high potential line 47) and the second potential line (low potential line 46) constituting the low-voltage power supply.

The transistors 33, 35, 36, and 37 have a smaller amount of flowing current than that of the first transistor 31 and the second transistor 32 operated by the high-voltage power supply, and thus an area of a channel formation region can be reduced. In other words, a fine memory circuit 60 can be achieved. A transistor capacity is reduced with the small area of the channel formation region of the transistors 33, 35, 36, and 37, thus resulting in fast charging and discharging. In other words, the image signal can be written or rewritten to the memory circuit 60 at a high speed.

In the exemplary embodiment, the third transistor 33, the fifth transistor 35, the sixth transistor 36, and the seventh transistor 37 included in the memory circuit 60 have a gate length in the plan view shorter than a gate length in the plan view of the first transistor 31 and the second transistor 32 arranged in series with the light emitting element 20.

The third transistor 33, the fifth transistor 35, the sixth transistor 36, and the seventh transistor 37 have a gate length in the plan view of $L_3=L_5=L_6=L_7$=0.5 micrometers (μm). As described above, the first transistor 31 and the second transistor 32 have a gate length in the plan view of $L_1=L_2$=0.75 micrometers (μm), and thus the third transistor 33, the fifth transistor 35, the sixth transistor 36, and the seventh transistor 37 have a shorter gate length.

In the exemplary embodiment, the third transistor 33, the fifth transistor 35, the sixth transistor 36, and the seventh transistor 37 have an area of a channel formation region in the plan view smaller than an area of a channel formation region in the plan view of the first transistor 31 and the second transistor 32. The area of the channel formation region of the transistor is substantially equal to an area, namely, a product of a gate length and a gate width in the plan view of the gate electrode arranged opposite from the transistor.

The gate width of the N-type third transistor 33 and the N-type seventh transistor 37 is $W_3=W_7$=0.5 micrometers (μm), and the gate width of the P-type fifth transistor 35 and the P-type sixth transistor 36 is $W_5=W_6$=0.75 micrometers (μm). Therefore, the area of the channel formation region of the third transistor 33 and the seventh transistor 37 is 0.5×0.5=0.25 square-micrometers (μm$^2$), and the area of the channel formation region of the fifth transistor 35 and the sixth transistor 36 is 0.5×0.75=0.375 square-micrometers (μm$^2$).

As described above, the gate width of the first transistor 31 is $W_1$=1.25 micrometers (μm), and thus the area of the channel formation region of the first transistor 31 is 0.75×1.25=0.9375 square-micrometers (μm$^2$). The gate width of the second transistor 32 is $W_2$=1.0 micrometers (μm), and thus the area of the channel formation region of the second transistor 32 is 0.75×1.0=0.75 square-micrometers (μm$^2$). Therefore, the third transistor 33, the fifth transistor 35, the sixth transistor 36, and the seventh transistor 37 have a smaller area of the channel formation region.

In this way, the transistors 33, 35, 36, and 37 included in the memory circuit 60 have an area of the channel formation region smaller than an area of the channel formation region of the transistors 31 and 32 arranged in series with the light emitting element 20 in the exemplary embodiment, such that the light emitting element 20 can emit light at high brightness while a fine memory circuit 60 can be achieved and operate at a high speed.

Driving Method of Pixel Circuit

Figure 10:
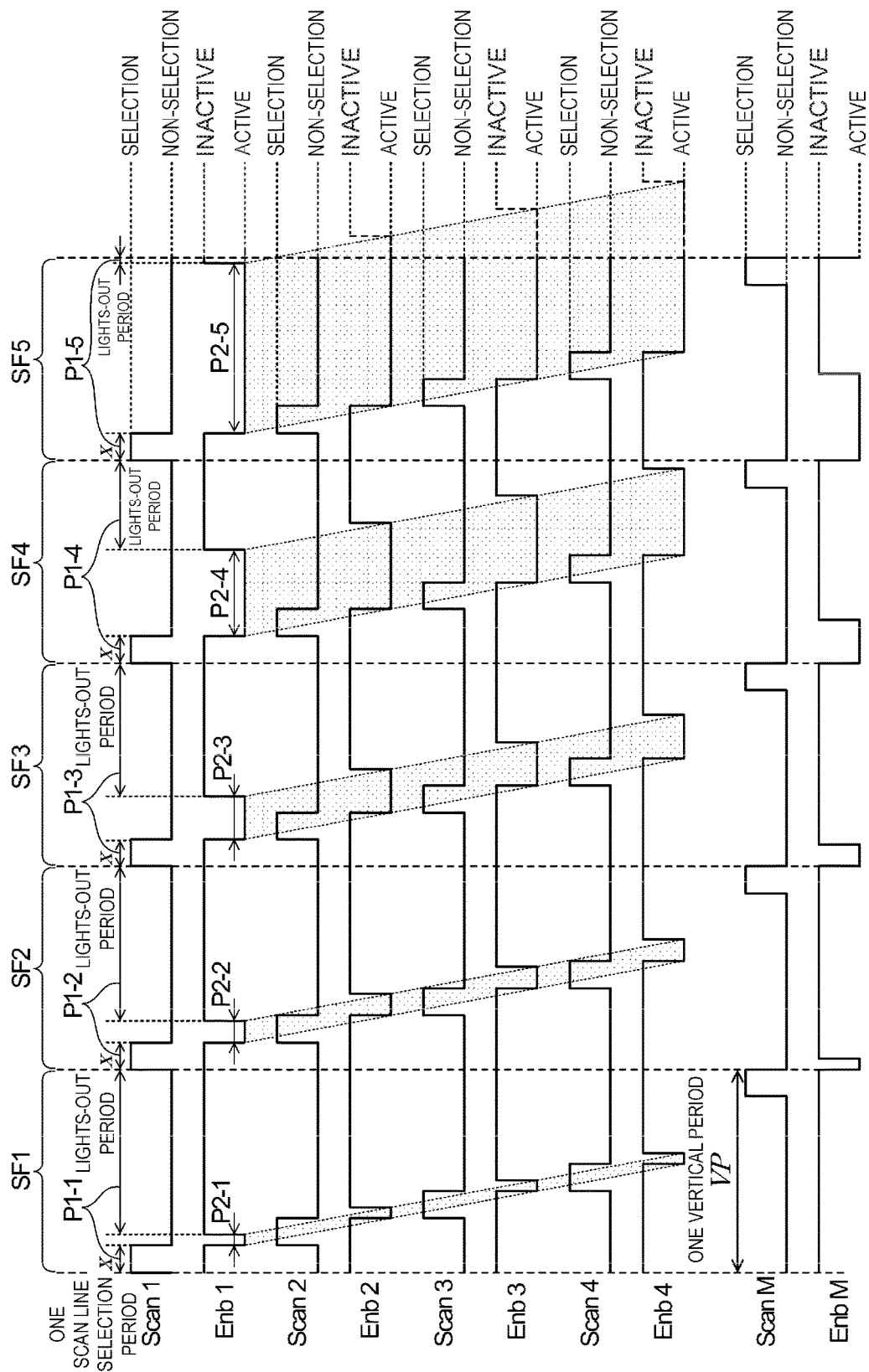
FIG. 10 illustrates a driving method of the pixel circuit according to the exemplary embodiment.

A driving method of the pixel circuit in the electro-optical device 10 according to the exemplary embodiment will now be described with reference to FIG. 10. FIG. 10 illustrates the driving method of the pixel circuit according to the exemplary embodiment. In FIG. 10, the horizontal axis is a time axis. FIG. 10 illustrates corresponding periods of the sub-field SF1 to the sub-field SF5 in the sub-pixel 58 group corresponding to the scan line 42 in the first row among the 16 sub-fields SF of SF1 to SF16 illustrated in FIG. 7.

In the vertical axis in FIG. 10, Scan 1 to Scan M represent the scan signals supplied to the scan lines 42 in the first row to the M-th row of the M scan lines 42 (refer to FIG. 5), respectively. The scan signal includes the selection signal as a scan signal in the selection-state and the non-selection signal as a scan signal in the non-selection-state. Enb 1 to Enb M represent the enable signals supplied to the M enable lines 44 (refer to FIG. 5). The enable signal includes the active signal as an enable signal in the active state and the inactive signal as an enable signal in the inactive state.

As described with reference to FIG. 7, the single field F during which a single image is displayed is divided into the plurality of sub-fields SF, and each sub-field SF includes the non-display period P1 and the display period P2 that starts immediately after the end of the one scan line selection period x. The non-display period P1 includes the one scan line selection period x and the lights-out period. The one scan line selection period x is a signal write period during which an image signal is written to the memory circuit 60 (refer to FIG. 9) in each pixel circuit 41 (refer to FIG. 5) arranged in the display region E. The display period P2 is a period that starts immediately after the end of the one scan line selection period x and during which that the light emitting element 20 (refer to FIG. 9) is allowed to emit light in each pixel circuit 41 arranged in the display region E. A period after the end of the display period P2 until the start of the one scan line selection period x of the next sub-field SF is the lights-out period.

As illustrated in FIG. 10, in the electro-optical device 10 according to the exemplary embodiment, the inactive signal is supplied as an enable signal to the enable lines 44 during the non-display period P1 as the first period. While the inactive signal is supplied to the enable lines 44, the first transistors 31 (refer to FIG. 9) are in the OFF-state, and thus the light emitting elements 20 are in the non-light-emissionon state in the pixel circuits 41.

The selection signal is supplied as a scan signal to the corresponding scan line 42 in the one scan line selection period x during the non-display period P1. When the selection signal is supplied to the scan line 42, the fourth transistor 34 and the eighth transistor 38 (refer to FIG. 9) in a selected pixel circuit 41 are turned into the ON-state. Thus, in the selected pixel circuit 41, an image signal is written to the memory circuit 60 from the data line 43 and the complementary data line 45 (refer to FIG. 9). In this way, the image signal is written to and stored in the memory circuit 60 in each pixel circuit 41 during the one scan line selection period. The M scan lines 42 are successively selected, and a period during which selection of each of the plurality of scan lines 42 is completed is the one vertical period VP.

In the display period P2 as the second period, the active signal is supplied as an enable signal to the enable lines 44. When the active signal is supplied to each enable line 44, the first transistor 31 is turned into the ON-state, thus allowing each light emitting element 20 in the pixel circuit 41 to emit light. During the display period P2, the non-selection signal that makes each fourth transistor 34 and eighth transistor 38 be in the OFF-state is supplied as a scan signal to the scan lines 42. Thus, the image signal written in this sub-field SF is held in the memory circuit 60 in each pixel circuit 41.

As described above, while the one scan line selection period x, namely, the one vertical period VP is identical in the 16 sub-fields SF of SF1 to SF16, a length of the display period P2 in an n-th sub-field is different from a length of the display period P2 in an n+1-th sub-field, and the length of the display period P2 in the n+1-th sub-field SF is twice the length of the display period P2 in the n-th sub-field SF.

In this way, the first period as the non-display period P1 during which an image signal is written to the memory circuit 60 while the light emitting element 20 is in the non-light-emission and the second period as the display period P2 during which the light emitting element 20 is allowed to emit light can be independently controlled and freely set in the exemplary embodiment. Thus, gray-scale display can be performed by digital time-division driving. In addition, as a result, the display period P2 can be set to be shorter than the non-display period P1, and thus an image with a larger number of gray scales can be easily displayed.

Furthermore, the non-display period P1 can be set by using the enable signal supplied to the enable lines 44, such that driving the electro-optical device 10 can be facilitated. In a case of digital driving without the non-display period P1, highly complicated driving is required to make the light emission period shorter than one vertical period VP within which selection of each of the plurality of scan lines 42 is completed. In contrast, in the exemplary embodiment, the enable signal supplied to the enable lines 44 is shared among the plurality of pixel circuits 41 for each row. Thus, even when there is a sub-field SF for which the light emission period is shorter than the one vertical period VP within which selection of each of the plurality of scan lines 42 is completed, the electro-optical device 10 can be readily driven by simply shortening the display period P2.

Method of Generating Enable Signal and Scan Signal

Figure 11:
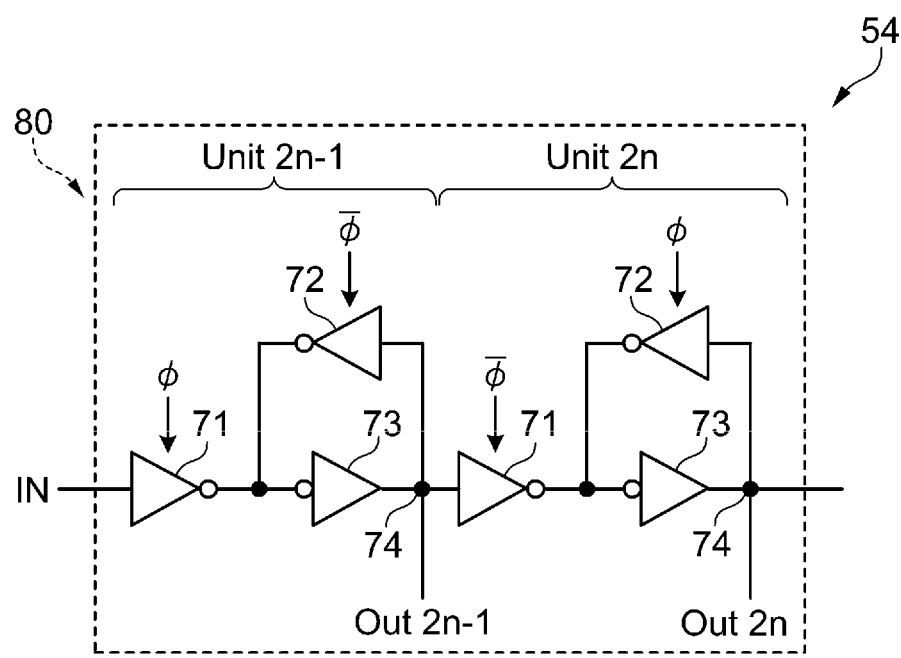
FIG. 11 illustrates a block diagram illustrating a configuration of an enable line drive circuit.
Figure 12:
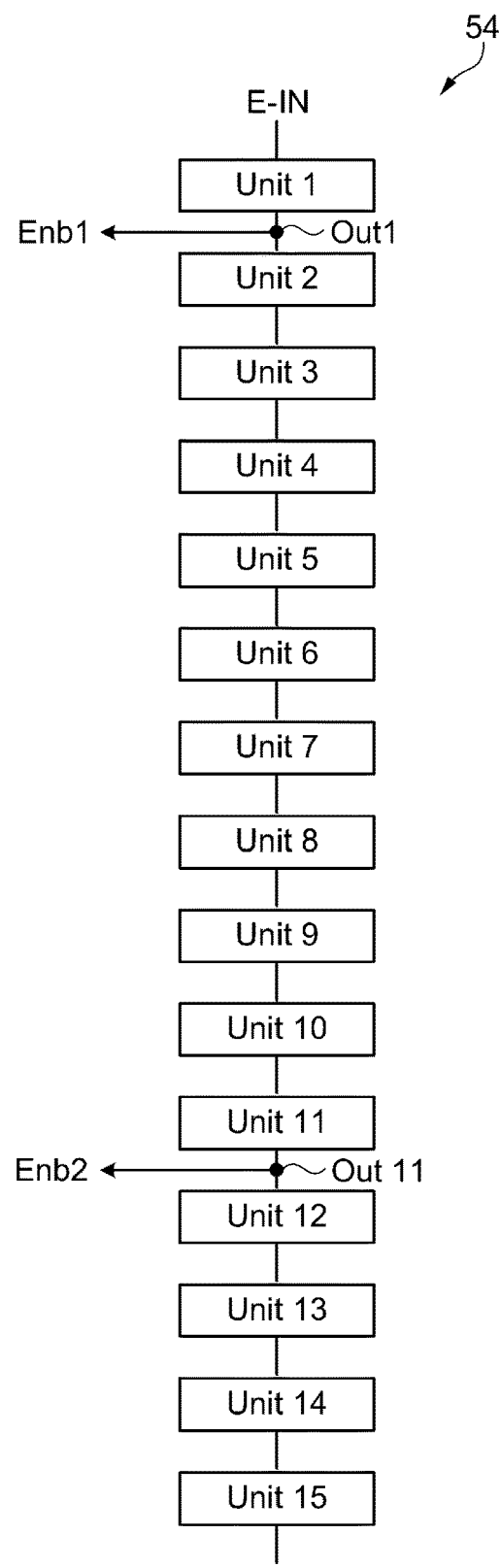
FIG. 12 illustrates a block diagram illustrating a configuration of the enable line drive circuit.
Figure 13:
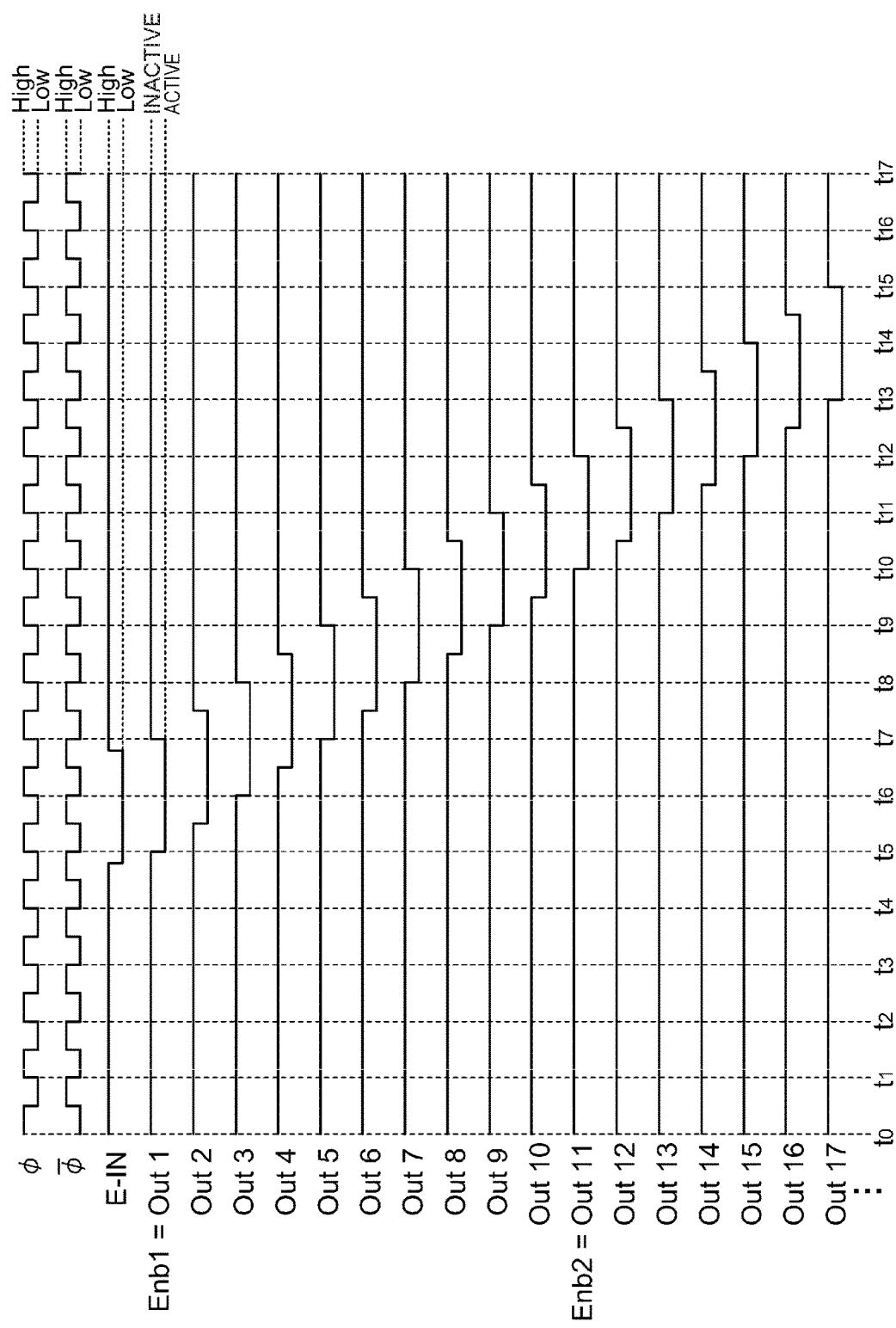
FIG. 13 illustrates a timing chart illustrating operations of the enable line drive circuit.

A method of generating an enable signal in an enable line drive circuit 54 and a method of generating a scan signal in a scan line drive circuit 52 will now be described. First, the method of generating an enable signal in the enable line drive circuit 54 will be described with reference to FIGS. 11 to 13. FIGS. 11 and 12 illustrate a block diagram illustrating a configuration of the enable line drive circuit. FIG. 13 illustrates a timing chart illustrating operations of the enable line drive circuit.

As illustrated in FIG. 11, the enable line drive circuit 54 is formed of a shift register circuit in which a plurality of flip-flop circuits 80 are arranged in series as one example. FIG. 11 illustrates the flip-flop circuit 80 in an n stage constituting the shift register circuit included in the enable line drive circuit 54 in the exemplary embodiment, and illustrates an element circuit in a 2n–1-th (where n is an integer of 1 or greater) stage and an element circuit in a 2n-th stage.

Each element circuit includes a clocked inverter 71, a clocked inverter 72, and an inverter 73. In each element circuit, the clocked inverter 71 is arranged in series with the clocked inverter 72 and the inverter 73 that are arranged in a circular fashion. An output terminal of the inverter 73 is an output terminal 74 of the element circuit.

In the following description, the element circuit in the 2n–1-th stage is also represented as Unit 2n–1, and an output signal from the output terminal 74 of the element circuit is also represented as Out 2n–1. The element circuit in the 2n-th stage is also represented as Unit 2n, and an output signal from the output terminal 74 of the element circuit is also represented as Out $2n$. An input signal supplied to the element circuit is represented as IN.

Operations of the element circuit of the flip-flop circuit 80 will be described with reference to FIG. 11. The clocked inverters 71 and 72 receive an input of an enable clock signal Φ or an enable clock inverted signal Φ bar (indicated with a horizontal bar above Φ in FIG. 11) as an inverted signal relative to the enable clock signal Φ. For example, when the enable clock signal Φ is High, the enable clock inverted signal Φ bar is Low. When the enable clock signal Φ is Low, the enable clock inverted signal Φ bar is High. In the exemplary embodiment, the clocked inverters 71 and 72 operate as inverters when the enable clock signal Φ or the enable clock inverted signal Φ bar is High, and do not operate when the enable clock signal Φ or the enable clock inverted signal Φ bar is Low.

In Unit $2n-1$, when the enable clock signal Φ is input to the clocked inverter 71, the enable clock inverted signal Φ bar is input to the clocked inverter 72. At this time, in Unit $2n$, the enable clock inverted signal Φ bar is input to the clocked inverter 71, and the enable clock signal Φ is input to the clocked inverter 72.

When the enable clock signal Φ is High and the enable clock inverted signal Φ bar is Low, the clocked inverter 71 operates as an inverter, and the clocked inverter 72 does not operate in Unit $2n-1$. Thus, the clocked inverter 71 and the inverter 73 are in a state of electrical coupling in series to each other. Therefore, the input signal IN or an output signal Out $2n-2$ of Unit $2n-2$ in a previous stage, which is not illustrated, is transferred from the clocked inverter 71 to the inverter 73, and the output signal Out $2n-1$ is output from the output terminal 74.

At this time, the clocked inverter 71 does not operate, and the clocked inverter 72 operates as an inverter in Unit $2n$. Thus, the clocked inverter 72 and the inverter 73 are electrically connected state in a circular fashion to each other. Therefore, the output signal Out $2n-1$ of Unit $2n-1$ is not transferred to Unit $2n$. The output signal Out $2n-1$ transferred from Unit $2n-1$ before the enable clock signal Φ is High is held between the inverter 73 and the clocked inverter 72 in Unit $2n$, and the output signal Out $2n$ is also output from the output terminal 74 and transferred to Unit $2n+1$ in a subsequent stage, which is not illustrated.

When the enable clock signal Φ is turned from High into Low and the enable clock inverted signal Φ bar is turned from Low to High, the clocked inverter 71 does not operate, and the clocked inverter 72 operates as an inverter in Unit $2n-1$. Thus, the clocked inverter 72 and the inverter 73 are electrically connected state in a circular fashion to each other. Therefore, the input signal IN is not input to Unit $2n-1$, and the signal transferred from the clocked inverter 71 to the inverter 73 before the enable clock signal Φ is Low is held between the inverter 73 and the clocked inverter 72, and the output signal Out $2n-1$ is also output from the output terminal 74.

At this time, the clocked inverter 71 operates as an inverter, and the clocked inverter 72 does not operate in Unit $2n$. Thus, the clocked inverter 71 and the inverter 73 are electrically connected state in series to each other. Therefore, the output signal Out $2n-1$ of Unit $2n-1$ is transferred from the clocked inverter 71 to the inverter 73, and the output signal Out $2n$ is output from the output terminal 74.

In this way, every time the enable clock signal Φ and the enable clock inverted signal Φ bar switch between High and Low, that is, every ½ cycle of the enable clock signal Φ and the enable clock inverted signal Φ bar, the output signal Out output from Unit in a previous stage based on the input signal E-IN is successively transferred to Unit in a subsequent stage. In other words, every one cycle of the enable clock signal Φ and the enable clock inverted signal Φ bar, a signal based on the input signal IN is transferred to Unit in a stage after a next stage.

FIG. 10 illustrates Unit 1 to Unit 15 among a plurality of Units (element circuits) included in the enable line drive circuit 54 in the exemplary embodiment. In the exemplary embodiment, the enable signal Enb is output to the enable line 44 every 10 units. As described above, the shortest display period P2-1 in the first sub-field SF1 among the display periods P2 in the sub-fields SF is 0.0002 milliseconds (=0.2 microseconds) and is 0.4 times the one scan line selection period x (=0.5 microseconds) (refer to FIG. 8). Then, the cycle of the enable clock signal Φ is set to be ¹⁄₁₀ of a cycle of a scan clock signal CL described later, such that two cycles of the enable clock signal Φ correspond to the display period P2-1 in the sub-field SF1. Therefore, the cycle of the enable clock signal Φ is 0.1 microseconds, and a frequency of the enable clock signal Φ is 10 MHz.

Accordingly, the frequency of the enable clock signal Φ is 10 times the frequency of the scan clock signal CL, and the number of Units as the element circuits included in the enable line drive circuit 54 is about 10 times the number of Units as the element circuits included in the scan line drive circuit 52 described later. The number of enable lines 44 is M that is the same as the number of scan lines 42, and thus the enable signal Enb is output to each of the enable lines 44 every 10 Units as the element circuits included in the enable line drive circuit 54.

As illustrated in FIG. 10, an output signal Out 1 output from Unit 1 (element circuit) in a first stage is output as an enable signal Enb 1 to the enable line 44 in a first row. Then, an output signal Out 11 output from Unit 11 (element circuit) in an eleventh stage is output as an enable signal Enb 2 to the enable line 44 in a second row. Therefore, the enable line drive circuit 54 includes the element circuits including the number of M×10+1 Units that is one more than 10 times the number of enable lines 44.

FIG. 13 illustrates each signal related to the enable signal Enb in the first sub-field SF1. In FIG. 13, the horizontal axis is a time axis. FIG. 13 illustrates a time $t_0$ to a time $t_{17}$. The time $t_0$ is a time at which the scan line 42 in the first row starts to be selected. The vertical axis indicates, from the upper row, the enable clock signal Φ, the enable clock inverted signal Φ bar, the input signal E-IN to the element circuit in the first stage, and output signals from Out 1 of Unit 1 to Out 17 of Unit 17 among the element circuits included in the enable line drive circuit 54.

Among the plurality of pixel circuits 41 arranged in the display region E, the scan line 42 in the first row as a first scan line corresponds to the enable line 44 in the first row as a first enable line for a first pixel circuit 41, and the scan line 42 in the second row as a second scan line corresponds to the enable line 44 in the second row as a second enable line for a second pixel circuit 41. As described above, the enable signal Enb 1 (Out 1) is output from Unit 1 to the enable line 44 in the first row, and the enable signal Enb 2 (Out 11) is output from Unit 11 to the enable line 44 in the second row.

A period between a time $t_n$ and a time $t_{n+1}$ corresponds to one cycle (=0.1 microseconds) of the enable clock signal Φ and the enable clock inverted signal Φ bar. The one scan line selection period x (=0.5 microseconds) corresponds to five cycles of the enable clock signal Φ and is from the time $t_N$ to a time $t_{N+5}$. Given that a time at which the scan line 42 in the first row starts to be selected is a third time, the third time is the time $t_0$. Therefore, the one scan line selection period x during which the scan line 42 in the first row is selected is from the third time $t_0$ to the time $t_5$.

The input signal E-IN supplied to the enable line drive circuit 54 is High from the third time $t_0$, at which the scan line 42 in the first row starts to be selected, to the time $t_4$, and is then turned from High into Low between the time $t_4$ and the time $t_5$ at which the one scan line selection period x ends. Therefore, Out 1 of Unit 1 is High and High as the inactive signal is supplied as the enable signal Enb 1 to the enable line 44 in the first row during the one scan line selection period x during which the scan line 42 in the first row is selected, and thus the light emitting element 20 does not emit light.

The input signal E-IN becomes Low between the time $t_4$ and the time $t_5$, and thus Out 1 of Unit 1 becomes Low when the enable clock signal Φ is turned from Low into High and the enable clock inverted signal Φ bar becomes Low at the time $t_5$. The input signal E-IN is turned from Low into High between the time $t_6$ and the time $t_7$ after a lapse of a period corresponding to two cycles of the enable clock signal Φ since the input signal E-IN becomes Low between the time $t_4$ and the time $t_5$. Then, Out 1 of Unit 1 becomes High when the enable clock signal Φ is turned from Low into High and the enable clock inverted signal Φ bar becomes Low at the time $t_7$.

Therefore, Out 1 of Unit 1 becomes Low during the two cycles (0.2 microseconds) of the enable clock signal Φ between the time $t_5$, at which the one scan line selection period x of the scan line 42 in the first row ends, and the time $t_7$, and Low as the active signal is supplied as the enable signal Enb 1 to the enable line 44 in the first row during this period. Given that a time at which the active signal starts to be supplied to the enable line 44 in the first row is a first time, the first time is the time $t_5$. A period (between the first time $t_5$ and the time $t_7$) during which the active signal is supplied to the enable line 44 in the first row is the display period P2, and the light emitting element 20 is allowed to emit light during this display period P2.

After being turned from Low into High between the time $t_6$ and the time $t_7$, the input signal E-IN supplied to the enable line drive circuit 54 is maintained to be High until the input signal E-IN is turned into Low between the time $t_4$ and the time $t_5$ during which the scan line 42 in the first row is selected in the next sub-field SF2. Therefore, Out 1 of Unit 1 is High and High as the inactive signal is supplied as Enb 1 to the enable line 44 in the first row after the time $t_7$ at which the display period P2 during which the active signal is supplied to the enable line 44 in the first row ends. A period after the end of this display period P2 until the start of the one scan line selection period x of the next sub-field SF is the lights-out period during which the light emitting element 20 does not emit light.

After the end of the one scan line selection period x of the scan line 42 in the first row, Out 1 of Unit 1 is transferred to Unit 2 and Out 2 of Unit 2 is then transferred to Unit in a subsequent stage successively every ½ cycle (=0.05 microseconds) of the enable clock signal Φ and the enable clock inverted signal Φ bar. Therefore, Out $2n$ of Unit $2n$ in the subsequent stage is Low after a lapse of the ½ cycle of the enable clock signal Φ until a lapse of the two cycles of the enable clock signal Φ with respect to Out $2n-1$ of Unit $2n-1$ in the previous stage.

Given that a time at which the scan line 42 in the second row starts to be selected is a fourth time, the fourth time is the time $t_5$. Therefore, the one scan line selection period x during which the scan line 42 in the second row is selected is from the time $t_5$ to the time $t_{10}$. Out 1 of Unit 1 is transferred to Unit 11 in a subsequent stage after 10 stages between the fourth time $t_5$ and the time $t_{10}$. Then, Out 11 of Unit 11 becomes Low at the time $t_{10}$, and Low as the active signal is supplied as the enable signal Enb 2 to the enable line 44 in the second row between the time $t_{10}$ and the time $t_{12}$.

Given that the time $t_{10}$ at which the active signal starts to be supplied to this enable line 44 in the second row is a second time, the second time $t_{10}$ is after a lapse of five cycles of the enable clock signal Φ from the first time $t_5$, unlike the first time $t_5$ at which the active signal starts to be supplied to the enable line 44 in the first row. Thus, the enable lines 44 can be successively scanned and turned into the active state without waiting the one vertical period VP within which selection of each of the plurality of scan lines 42 is completed. Therefore, the enable lines 44 can be turned into the active state to allow the light emitting element 20 to emit light upon the completion of the selection of the scan line 42 for each pixel circuit 41. In other words, a period during which the light emitting element 20 is in the non-light-emission can be shortened, and thus a bright state can be achieved.

Herein, the fourth time is the same as the first time $t_5$. A time difference between the first time $t_5$ and the second time $t_{10}$ is equal to a time difference between the third time $t_0$ and the fourth time $t_5$ and is the one scan line selection period x (=0.5 microseconds). Therefore, a cycle in which the selection signal is supplied to the scan line 42 can be identical to a cycle in which the active signal is supplied to the enable line 44. As a result, the enable line 44 can be successively turned into the active state for each pixel circuit 41 according to selection of the scan line 42, and the light emitting element 20 is allowed to emit light upon the completion of the selection of the scan line 42.

Hereinafter, similarly, Out $2n-1$ of Unit $2n-1$ in the previous stage is successively transferred to Unit $2n$ in the subsequent stage every ½ cycle of the enable clock signal Φ, the active signal is supplied to the enable line 44 every five cycles of the enable clock signal Φ, and the enable line 44 is in the active state during the two cycles of the enable clock signal Φ.

Note that, a period during which the input signal E-IN of Low is supplied in each sub-field SF is set in such a way that the display period P2-2 in the second sub-field SF2 is twice (=0.4 microseconds) the display period P2-1 in the sub-field SF1, and the display period P2-3 in the third sub-field SF3 is twice (=0.8 microseconds) the display period P2-2 in the sub-field SF2.

Figure 14:
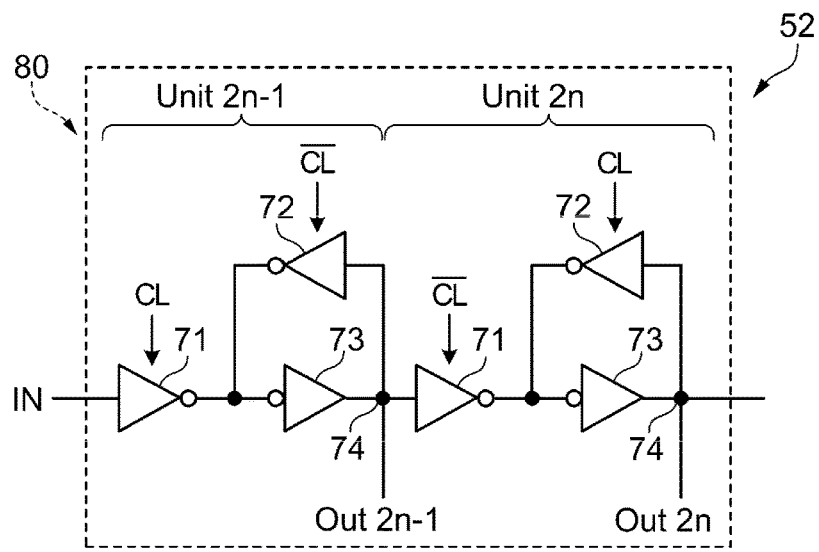
FIG. 14 illustrates a block diagram illustrating a configuration of a scan line drive circuit.
Figure 15:
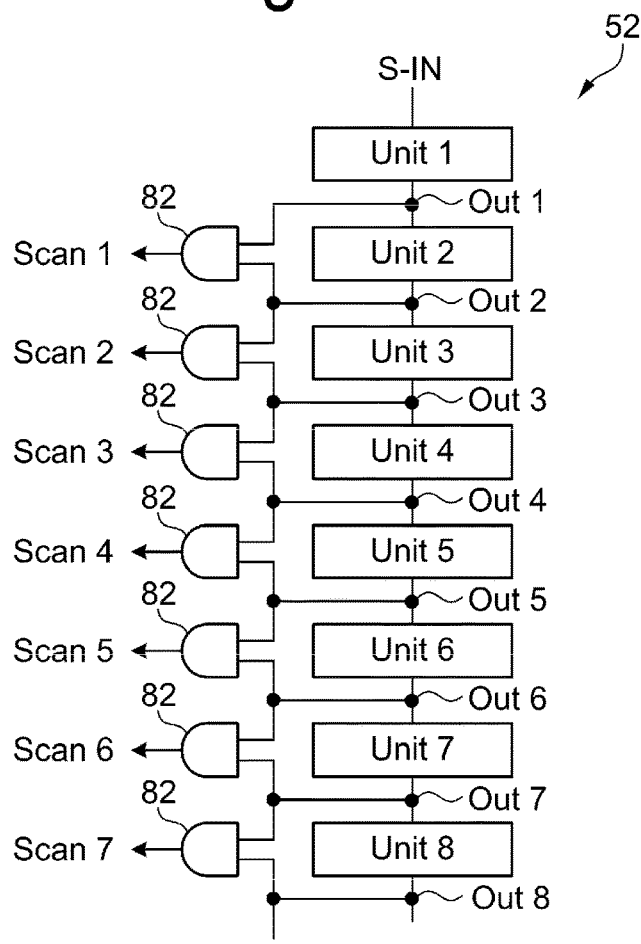
FIG. 15 illustrates a block diagram illustrating a configuration of the scan line drive circuit.
Figure 16:
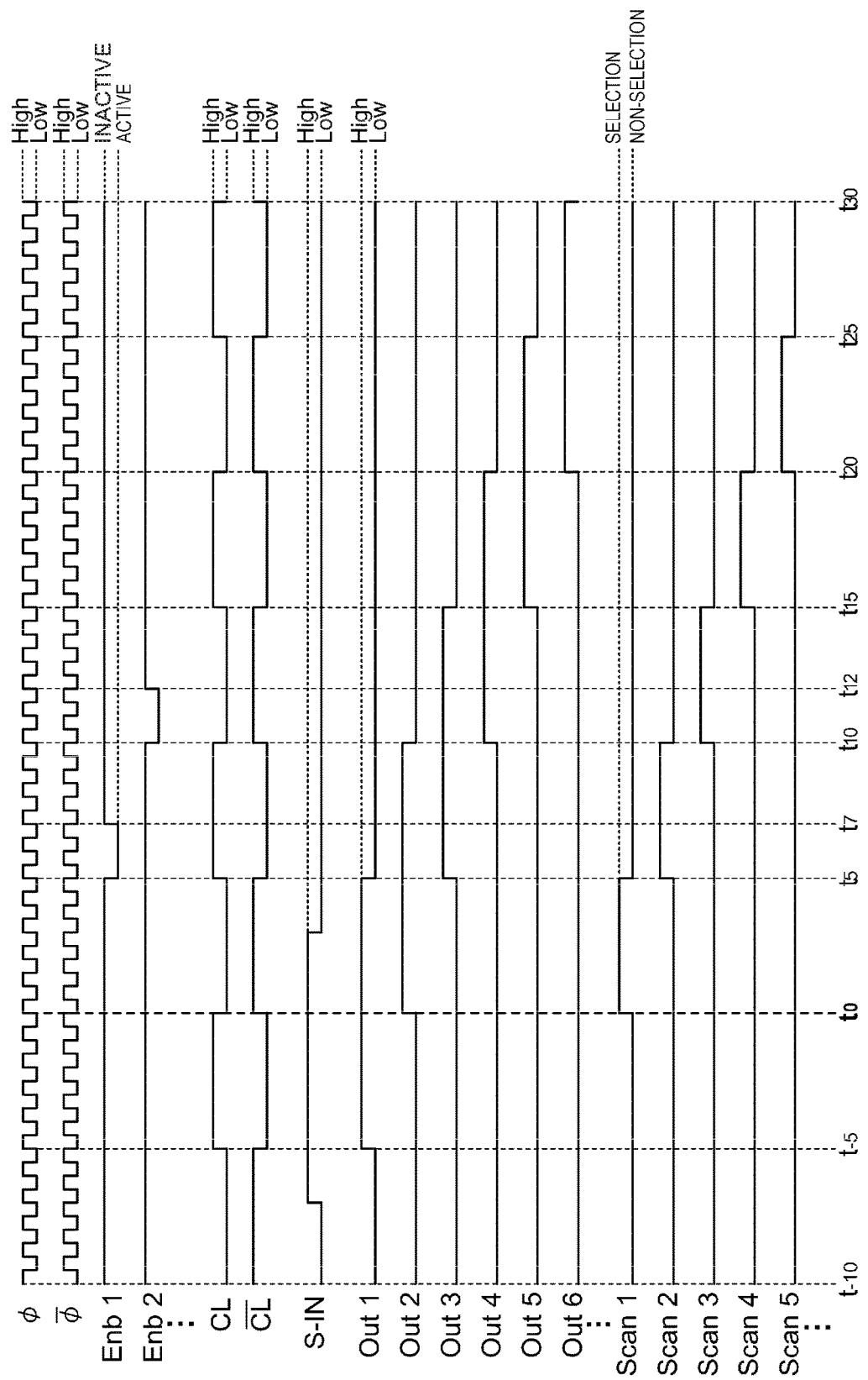
FIG. 16 illustrates a timing chart illustrating operations of the scan line drive circuit.

Next, the method of generating a scan signal in the scan line drive circuit 52 will be described with reference to FIGS. 14 to 16. FIGS. 14 and 15 illustrate a block diagram illustrating a configuration of the scan line drive circuit. FIG. 16 illustrates a timing chart illustrating operations of the scan line drive circuit. As illustrated in FIG. 14, the scan line drive circuit 52 also includes a plurality of element circuits each including a clocked inverter 71, a clocked inverter 72, and an inverter 73, similarly to the enable line drive circuit 54. An input signal supplied to the scan line drive circuit 52 is represented as S-IN. Note that, operations of the element circuit included in the scan line drive circuit 52 are the same as those in the enable line drive circuit 54, and thus description thereof will be omitted.

The clocked inverters 71 and 72 receive an input of a scan clock signal CL or a scan clock inverted signal CL bar (indicated with a horizontal bar above CL in FIG. 14) as an inverted signal relative to the scan clock signal CL. Also, in the scan line drive circuit 52, the clocked inverters 71 and 72 operate as inverters when the scan clock signal CL or the scan clock inverted signal CL bar is High, and do not operate when the scan clock signal CL or the scan clock inverted signal CL bar is Low.

With such a configuration, every time the scan clock signal CL and the scan clock inverted signal CL bar switch between High and Low, that is, every ½ cycle of the scan clock signal CL and the scan clock inverted signal CL bar, the output signal Out output from Unit in a previous stage based on the input signal IN is successively transferred to Unit in a subsequent stage. In other words, every one cycle of the scan clock signal CL and the scan clock inverted signal CL bar, a signal based on the input signal IN is transferred to Unit in a stage after a next stage.

As illustrated in FIG. 15, the scan line drive circuit 52 is formed of a plurality of element circuits and a plurality of AND circuits 82 as one example. FIG. 15 illustrates Unit 1 to Unit 8 among the plurality of element circuits and the AND circuits 82 electrically connected to the element circuits of Unit 1 to Unit 8 included in the scan line drive circuit 52 in the exemplary embodiment.

The scan line drive circuit 52 in the exemplary embodiment obtains an logical product of outputs from two Units adjacent to each other among the plurality of element circuits arranged in series in the AND circuit 82, and supplies as a scan signal to the scan line 42. For example, a scan signal Scan 1 acquired in the AND circuit 82 as a logical product of Out 1 of Unit 1 (element circuit) in a first stage and Out 2 of Unit 2 (element circuit) in a second state is supplied to the scan line 42 in the first row.

Further, a scan signal Scan 2 acquired in the AND circuit 82 as a logical product of Out 2 of Unit 2 (element circuit) in the second stage and Out 3 of Unit 3 (element circuit) in a third state is supplied to the scan line 42 in the second row. Therefore, the scan line drive circuit 52 includes M+1 Units (element circuits) that are one more than the number of the scan lines 42 and M AND circuits 82 that are the same in the number of the scan lines 42.

FIG. 16 illustrates each signal related to the scan signal Scan in the first sub-field SF1. In FIG. 16, the horizontal axis is a time axis. FIG. 16 illustrates a time $t_{-10}$ to a time $t_{30}$. The vertical axis indicates the enable clock signal Φ, the enable clock inverted signal Φ bar, Enb 1, and Enb 2 in the enable line drive circuit 54 described above for comparison in the upper rows, and indicates, below this, the scan clock signal CL, the scan clock inverted signal CL bar, the input signal S-IN, output signals from Out 1 of Unit 1 to Out 6 of Unit 6, and scan signals from Scan 1 to Scan 5 in the scan line drive circuit 52.

As described above, the cycle of the scan clock signal CL and the scan clock inverted signal CL bar is 10 times the cycle of the enable clock signal Φ and the enable clock inverted signal Φ bar. Therefore, the cycle of the scan clock signal CL is 1 microsecond, and a frequency of the scan clock signal CL is 1 MHz. The cycle of the scan clock signal CL is twice the one scan line selection period x (=0.5 microseconds). In other words, the one scan line selection period x is from the time $t_n$ to the time $t_{n+5}$, and one cycle of the scan clock signal CL is from the time $t_n$ to the time $t_{n+10}$.

The scan clock signal CL is Low in the ½ cycle (e.g. between the time $t_{-10}$ and the time $t_{-5}$) in the first half and is High in the ½ cycle (e.g. between the time $t_{-5}$ and the time $t_0$) in the second half. Therefore, the scan clock inverted signal CL bar is High in the ½ cycle (e.g. between the time $t_{-10}$ and the time $t_{-5}$) in the first half and is Low in the ½ cycle (e.g. between the time $t_{-5}$ and the time $t_0$) in the second half.

The input signal S-IN supplied to the scan line drive circuit 52 is turned from Low into High during the ½ cycle in the first half that is one cycle of the scan clock signal CL before the time $t_0$ at which the scan line 42 in the first row is selected, namely, between the time $t_{-10}$ and the time $t_{-5}$. Therefore, Out 1 of Unit 1 is Low during the ½ cycle (e.g. between the time $t_{-10}$ and the time $t_{-5}$) in the first half of the scan clock signal CL.

The input signal S-IN is turned from High into Low between the time $t_0$ and the time $t_5$ after a lapse of a period corresponding to one cycle of the scan clock signal CL since the input signal S-IN becomes High between the time $t_{-10}$ and the time $t_{-5}$. Hereinafter, the input signal S-IN is held to be Low until the input signal S-IN becomes High between the time $t_{-10}$ and the time $t_{-5}$ before the scan line 42 in the first row is selected in the next sub-field SF2.

The input signal S-IN becomes High between the time $t_{-10}$ and the time $t_{-5}$, and thus Out 1 of Unit 1 becomes High when the scan clock signal CL is turned from Low into High and the scan clock inverted signal CL bar becomes Low at the time $t_{-5}$. Then, the input signal S-IN is turned from High into Low between the time $t_0$ and the time $t_5$, and thus Out 1 of Unit 1 becomes Low when the scan clock signal CL is turned from Low into High and the scan clock inverted signal CL bar becomes Low at the time $t_5$. In other words, Out 1 of Unit 1 is High between the time $t_{-5}$ and the time $t_5$ corresponding to one cycle (=twice the one scan line selection period x) of the scan clock signal CL including the one scan line selection period x (between the time $t_0$ and the time $t_5$) of the scan line 42 in the first row, and is subsequently maintained to be Low.

After the end of the one scan line selection period x of the scan line 42 in the first row, Out 1 of Unit 1 is transferred to Unit 2 and Out 2 of Unit 2 is then transferred to Unit in a subsequent stage successively every ½ cycle (=the one scan line selection period x) of the scan clock signal CL and the scan clock inverted signal CL bar. Therefore, Out $2n$ of Unit $2n$ in the subsequent stage is High after a lapse of the ½ cycle of the scan clock signal CL until a lapse of the one cycle of the scan clock signal CL with respect to Out $2n-1$ of Unit $2n-1$ in the previous stage.

As described above, the scan signal Scan 1 acquired in the AND circuit 82 as the logical product of Out 1 of Unit 1 and Out 2 of Unit 2 is supplied to the scan line 42 in the first row. Out 1 of Unit 1 and Out 2 of Unit 2 are both High in the one scan line selection period x between the time $t_0$ and the time $t_5$ during which the scan line 42 in the first row is selected. Thus, High as the selection signal is supplied as the scan signal Scan 1 to the scan line 42 in the first row.

At least one of Out 1 of Unit 1 and Out 2 of Unit 2 is Low after the time $t_5$ subsequent to the end of the one scan line selection period x of the scan line 42 in the first row. Thus, Low as the non-selection signal is supplied as the scan signal Scan 1 to the scan line 42 in the first row. Note that, as described above, Low as the active signal is supplied as the enable signal Enb 1 to the enable line 44 in the first row between the time $t_5$, at which the one scan line selection period x of the scan line 42 in the first row ends, and the time $t_7$.

The scan signal Scan 2 acquired in the AND circuit 82 as the logical product of Out 2 of Unit 2 and Out 3 of Unit 3 is supplied to the scan line 42 in the second row. Out 2 of Unit 2 and Out 3 of Unit 3 are both High in the one scan line selection period x between the time $t_5$ and the time $t_{10}$ during which the scan line 42 in the second row is selected. Thus, the selection signal (High) is supplied as the scan signal Scan 2 to the scan line 42 in the second row.

At least one of Out 2 of Unit 2 and Out 3 of Unit 3 is Low after the time $t_{10}$ subsequent to the end of the one scan line selection period x of the scan line 42 in the second row. Thus, the non-selection signal (Low) is supplied as the scan signal Scan 2 to the scan line 42 in the second row. Note that, as described above, the active signal (Low) is supplied as the enable signal Enb 2 to the enable line 44 in the second row between the time $t_{10}$, at which the one scan line selection period x of the scan line 42 in the second row ends, and the time $t_{12}$.

In this way, Out 2n−1 of Unit 2n−1 in the previous stage is successively transferred to Unit 2n in the subsequent stage every ½ cycle of the scan clock signal CL. The selection signal (High) is supplied as the scan signal Scan n to a next scan line 42 during the one scan line selection period x every lapse of the ½ cycle of the scan clock signal CL as the one scan line selection period x. Then, the scan line 42 is selected.

As described above, with the configuration of the pixel circuit 41 according to the exemplary embodiment, an electro-optical device 10 that can display a high-quality image having a high-resolution and multiple gray scales at a low power consumption and also operate at a high speed and achieve a bright state is achieved.

The exemplary embodiments described above merely represent one aspect of the invention and any variation and application may be possible within the scope of the invention. For example, the followings are modified examples other than those described above.

Modified Example 1

While the pixel circuit 41 in the exemplary embodiment described above includes the P-type first transistor 31 as a control circuit, the invention is not limited to such an aspect. The pixel circuit 41 may include an N-type first transistor 31 as a control circuit. When the first transistor 31 is the N-type, the first transistor 31 is arranged on the low potential side with respect to the light emitting element 20 in FIG. 9. In other words, the first transistor 31 is arranged between the light emitting element 20 and the second transistor 32 or between the second transistor 32 and the second potential line (low potential line 46). When the first transistor 31 is the N-type, the active signal is set to be High (high potential) and the inactive signal is set to be Low (low potential).

Modified Example 2

Figure 17:
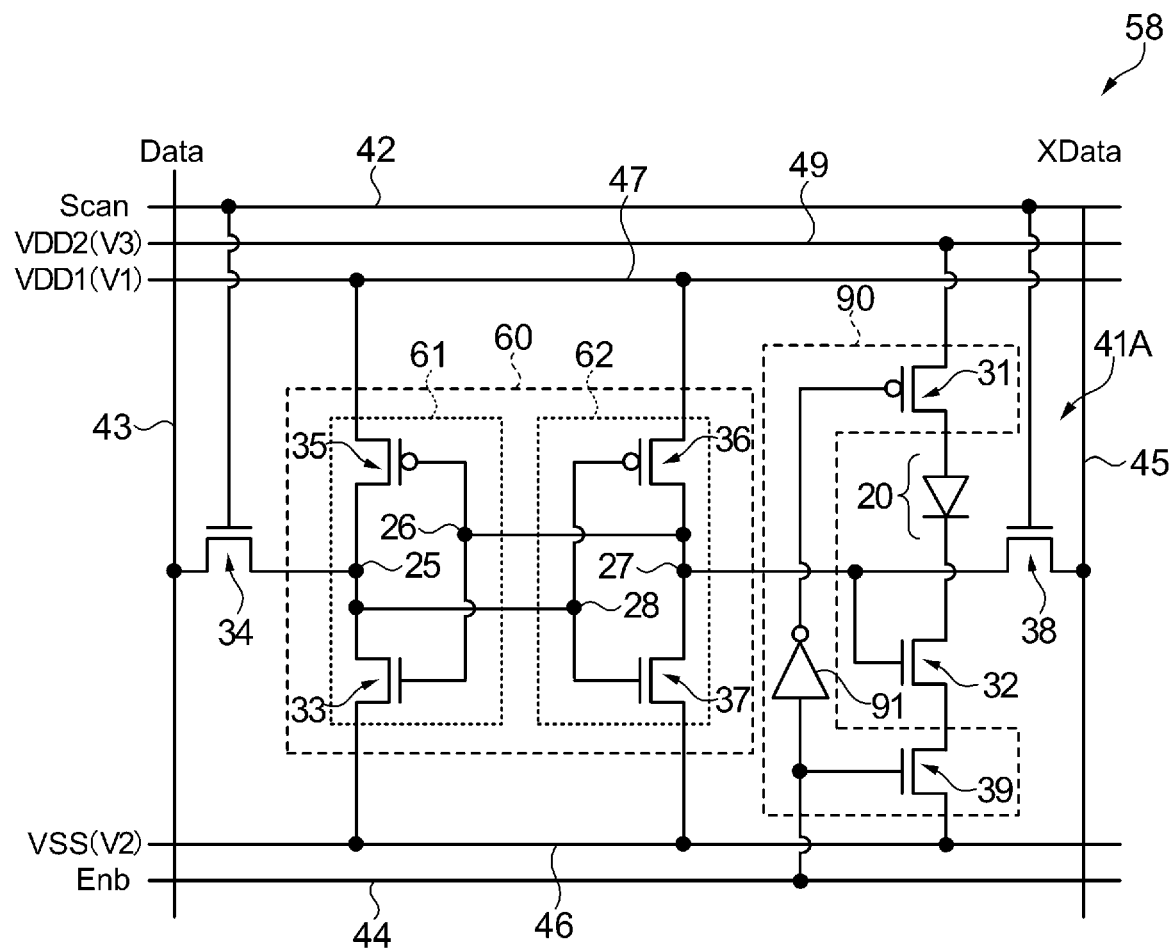
FIG. 17 illustrates a configuration of a pixel circuit according to Modified Example 2.
Figure 18:
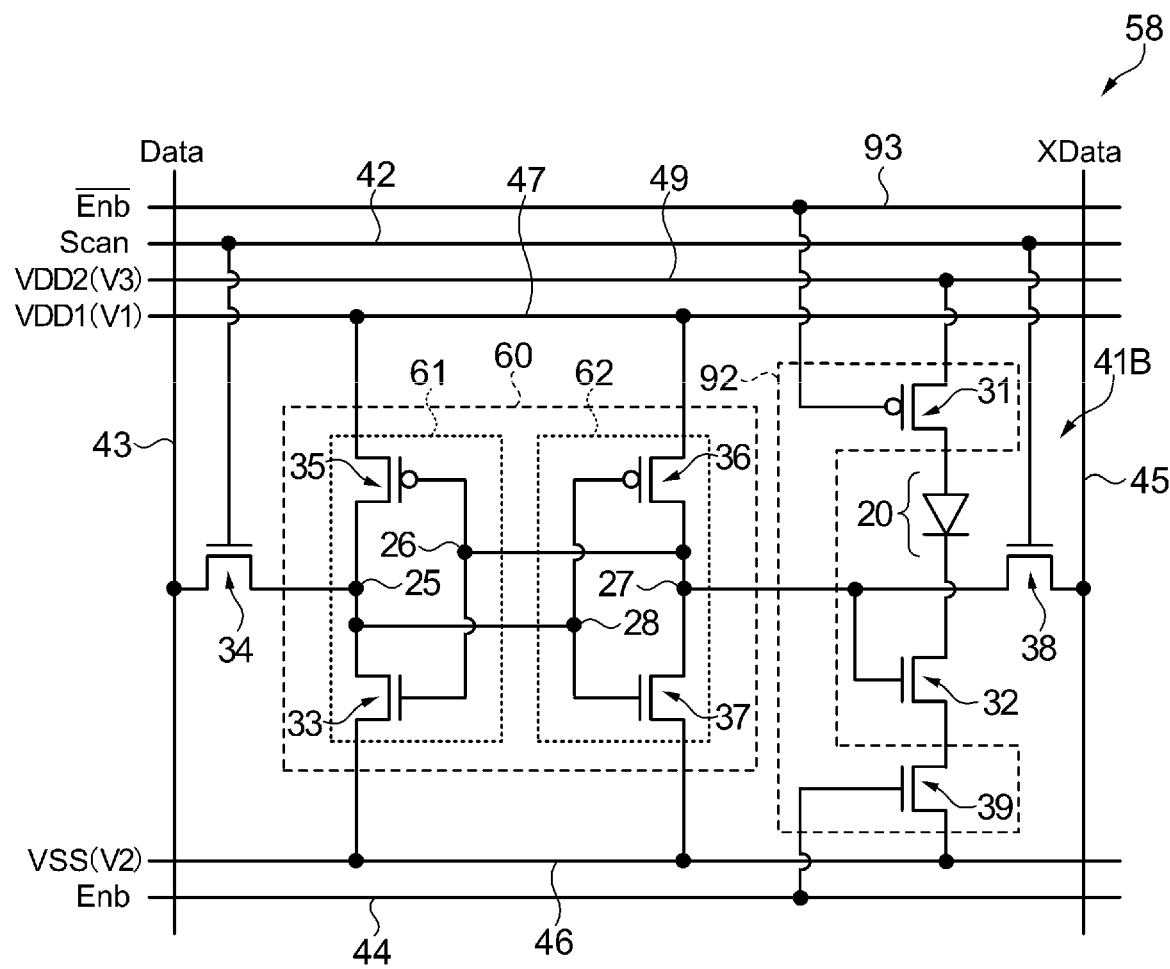
FIG. 18 illustrates a configuration of the pixel circuit according to Modified Example 2.

While the pixel circuit 41 in the exemplary embodiment described above includes the first transistor 31 as a control circuit, the invention is not limited to such an aspect. The control circuit may include a circuit element other than the first transistor 31. FIGS. 17 and 18 illustrate a configuration of a pixel circuit according to Modified Example 2.

For example, a pixel circuit 41A illustrated in FIG. 17 includes a light emitting element 20, a control circuit 90, an N-type second transistor 32, a memory circuit 60, an N-type fourth transistor 34, and an N-type eighth transistor 38. The control circuit 90 includes a P-type first transistor 31, an N-type ninth transistor 39, and an inverter 91. The first transistor 31 and the ninth transistor 39 are arranged in series with the light emitting element 20 and the second transistor 32 between a third potential line (high potential line 49) and a second potential line (low potential line 46). The first transistor 31 is arranged on the high potential side and the ninth transistor 39 is arranged on the low potential side with respect to the light emitting element 20. The gate of the first transistor 31 and the gate of the ninth transistor 39 are electrically connected to an enable line 44. The inverter 91 is arranged between the gate of the first transistor 31 and the gate of the ninth transistor 39.

In the control circuit 90, when an active signal of High (high potential) is supplied from the enable line 44, the first transistor 31 and the ninth transistor 39 are turned into the ON-state and the light emitting element 20 is allowed to emit light. Then, when a inactive signal of Low (low potential) is supplied from the enable line 44, the first transistor 31 and the ninth transistor 39 are turned into the OFF-state and the light emitting element 20 is turned into the non-light-emission.

A pixel circuit 41B illustrated in FIG. 18 includes a light emitting element 20, a control circuit 92, an N-type second transistor 32, a memory circuit 60, an N-type fourth transistor 34, and an N-type eighth transistor 38. Each pixel circuit 41B further includes a complementary enable line 93 in addition to the enable line 44. The control circuit 92 includes a P-type first transistor 31 and an N-type ninth transistor 39. The first transistor 31 and the ninth transistor 39 are arranged in series with the light emitting element 20 and the second transistor 32 between the third potential line (high potential line 49) and the second potential line (low potential line 46). The first transistor 31 is arranged on the high potential side and the ninth transistor 39 is arranged on the low potential side with respect to the light emitting element 20. The gate of the first transistor 31 is electrically connected to the complementary enable line 93. The gate of the ninth transistor 39 is electrically connected to the enable line 44.

In the control circuit 92, when an active signal of High (high potential) is supplied from the enable line 44, an active signal of Low (low potential) is supplied from the complementary enable line 93. When a inactive signal of Low (low potential) is supplied from the enable line 44, a inactive signal of High (high potential) is supplied from the complementary enable line 93. When the active signal is supplied from the enable line 44 and the complementary enable line 93, the first transistor 31 and the ninth transistor 39 are turned into the ON-state and the light emitting element 20 is allowed to be in light emission state. When the inactive signal is supplied from the enable line 44 and the complementary enable line 93, the first transistor 31 and the ninth transistor 39 are turned into the OFF-state and the light emitting element 20 is turned into the non-light-emission.

Modified Example 3

While all of the second transistor 32, the fourth transistor 34, and the eighth transistor 38 are the N-type in the pixel circuit 41 in the exemplary embodiment described above, the invention is not limited to such an aspect. All of the second transistor 32, the fourth transistor 34, and the eighth transistor 38 may be the P-type. In such a case, the high potential and the low potential are replaced with each other. The first potential V1 is a first low potential VSS1 (for example, VSS1=4.0 V), the second potential V2 is a high potential VDD (for example, VDD=7.0 V), and the third potential V3 is a second low potential VSS2 (for example, VSS2=0 V).

When the second transistor 32 is the P-type, the potential of the output terminal 27 with the image signal stored in the memory circuit 60 corresponding to the light emission is Low (low potential), and the potential of the output terminal 27 with the image signal corresponding to the non-light-emission is High (high potential). When the fourth transistor 34 and the eighth transistor 38 are the P-type, the selection signal supplied from the scan line 42 is set to be Low (low potential), and the non-selection signal is set to be High (high potential).

When the second transistor 32 is the P-type and the first transistor 31 is the N-type, the second transistor 32 is arranged on the high potential side and the first transistor 31 is arranged on the low potential side with respect to the light emitting element 20. When both of the second transistor 32 and the first transistor 31 are the P-type, the second transistor 32 and the first transistor 31 are arranged on the high potential side with respect to the light emitting element 20. Note that, when both of the second transistor 32 and the first transistor 31 are the P-type, the first transistor 31 may be arranged on the high potential side with respect to the second transistor 32 or arranged between the second transistor 32 and the light emitting element 20.

Modified Example 4

While the gate of the second transistor 32 is electrically connected to the output terminal 27 of the second inverter 62 of the memory circuit 60 in the pixel circuit 41 in the exemplary embodiment described above, the invention is not limited to such an aspect. The gate of the second transistor 32 may be electrically connected to the output terminal 25 of the first inverter 61 of the memory circuit 60.

Modified Example 5

While, in the pixel circuit 41 in the exemplary embodiment described above, the fourth transistor 34 is arranged between the input terminal 28 of the second inverter 62 of the memory circuit 60 and the data line 43, and the eighth transistor 38 is arranged between the input terminal 26 of the first inverter 61 of the memory circuit 60 and the complementary data line 45, the invention is not limited to such an aspect. The fourth transistor 34 may be arranged between the input terminal 26 of the first inverter 61 and the data line 43, and the eighth transistor 38 may be arranged between the input terminal 28 of the second inverter 62 and the complementary data line 45.

Modified Example 6

While the memory circuit 60 includes the two inverters 61 and 62 in the pixel circuit 41 of the exemplary embodiments described above, the invention is not limited to such an aspect. The memory circuit 60 may include two or any greater even number of inverters.

Modified Example 7

While in the exemplary embodiments (examples and modified examples) described above, an organic EL device in which the light emitting elements 20 each including an organic EL element are arranged in 720 rows×3840 (1280× 3) columns on the element substrate 11 formed from a single-crystal silicon substrate as a single-crystal semiconductor substrate is described as an exemplary electro-optical device, the electro-optical device of the invention is not limited to such an aspect. For example, the electro-optical device may be configured with thin film transistors (TFTs) to serve as an each of the transistors formed on the element substrate 11 formed from a glass substrate, or it may be configured with TFTs formed on a flexible substrate formed of polyimide and the like. Alternatively, the electro-optical device may be a micro LED display in which fine LED elements serving as light emitting elements are arranged at high density, or it may be a quantum dots display using a nano-sized semiconductor crystalline material as a light emitting element. The electro-optical device may use, as a color filter, quantum dots that can convert incident light into light with a different wavelength.

Modified Example 8

While in the exemplary embodiments described above, the see-through-type head-mounted display 100 with an integrated electro-optical device 10 is described as an exemplary electronic apparatus, the electro-optical device 10 of the invention may be applied to other types of electronic apparatus including closed-type head-mounted displays. Other types of electronic apparatus include, for example, projectors, rear-projection televisions, direct-viewing televisions, cell phones, portable audio devices, personal computers, video camera monitors, automotive navigation devices, head-up displays, pagers, electronic organizers, calculators, wearable devices such as wristwatches, hand-held displays, word processors, workstations, video phones, POS terminals, digital still cameras, signage displays, and the like.

The entire disclosure of the Japanese Patent Application No. 2018-013830, filed Jan. 30, 2018 is expressly incorporated by reference herein.

What is claimed is:
1. An electro-optical device comprising:
a scan line;
a data line;
a pixel circuit located at a position corresponding to an intersection of the scan line and the data line; and
an enable line, wherein
the pixel circuit includes a memory circuit, a light emitting element, and a control circuit,
the light emitting element changes brightness in response to an image signal held in the memory circuit,
the control circuit controls state of the light emitting element between a light emission state and a non-light-emission state to display a single image during a field,
the field includes a first sub-field and a second sub-field,
the first sub-field includes a first period, during which the light emitting element does not emit light, and a second period during which the light emitting element is allowed to emit light,
the second sub-field includes a third period, during which the light emitting element does not emit light, and a fourth period during which the light emitting element is allowed to emit light,
a length of the fourth period is longer than a length of the second period,
a length of the first period is equal to a length of the third period,
the length of the fourth period is longer than one vertical period from a first time, at which selection potential starts to be supplied to the scan line in the first sub-field, to a second time at which selection potential starts to be supplied to the scan line in a next sub-field subsequent to the first sub-field, the field further includes a third sub-field,
the third sub-field includes a fifth period, during which the light emitting element does not emit light, and a sixth period during which the light emitting element is allowed to emit light,
a length of the sixth period is longer than the length of the fourth period, and
a length of the fifth period is equal to the length of the first period.

2. An electronic apparatus comprising the electro-optical device according to claim 1.

3. An electro-optical device comprising:
a scan line;
a data line;
a pixel circuit located at a position corresponding to an intersection of the scan line and the data line; and
an enable line, wherein
the pixel circuit includes a memory circuit, a light emitting element, and a control circuit,
the light emitting element changes brightness in response to an image signal held in the memory circuit,
the control circuit controls state of the light emitting element between a light emission state and a non-light-emission state to display a single image during a field,
the field includes a first sub-field and a second sub-field,
the first sub-field includes a first period, during which the light emitting element does not emit light, and a second period during which the light emitting element is allowed to emit light,
the second sub-field includes a third period, during which the light emitting element does not emit light, and a fourth period during which the light emitting element is allowed to emit light,
a length of the first period is longer than a length of the third period,
a length of the fourth period is longer than a length of the second period, and
a length of the second sub-field is longer than a length of the first sub-field.

4. The electro-optical device according to claim 3, wherein
the length of the first sub-field is equal to one vertical period from a first time, at which selection potential starts to be supplied to the scan line in the first sub-field, to a second time at which selection potential starts to be supplied to the scan line in a next sub-field subsequent to the first sub-field.

5. The electro-optical device according to claim 4, wherein
the field further includes a third sub-field,
the third sub-field includes a fifth period, during which the light emitting element does not emit light, and a sixth period during which the light emitting element is allowed to emit light, and
a length of the third sub-field is longer than a length of the second sub-field.

6. The electro-optical device according to claim 5, wherein
a length of the sixth period is longer than the length of the fourth period.

7. An electronic apparatus comprising the electro-optical device according to claim 3.

8. An electro-optical device comprising:
a scan line;
a data line;
a pixel circuit located at a position corresponding to an intersection of the scan line and the data line; and
an enable line, wherein
the pixel circuit includes a memory circuit, a light emitting element, and a control circuit,
the light emitting element changes brightness in response to an image signal held in the memory circuit,
the control circuit controls state of the light emitting element between a light emission state and a non-light-emission state to display a single image during a field,
the field includes a first sub-field, a second sub-field and a third sub-field,
the first sub-field includes a first period, during which the light emitting element does not emit light, and a second period during which the light emitting element is allowed to emit light,
the second sub-field includes a third period, during which the light emitting element does not emit light, and a fourth period during which the light emitting element is allowed to emit light,
the third sub-field includes a fifth period, during which the light emitting element does not emit light, and a sixth period during which the light emitting element is allowed to emit light,
a length of the first period is longer than a length of the third period,
a length of the third period is longer than a length of the fifth period,
a length of the first sub-field is equal to a length of the second sub-field,
a length of the third sub-field is longer than the length of the first sub-field, and
the length of the first sub-field is equal to one vertical period from a first time, at which selection potential starts to be supplied to the scan line in the first sub-field, to a second time at which selection potential starts to be supplied to the scan line in a next sub-field subsequent to the first sub-field.

9. The electro-optical device according to claim 8, wherein
a length of the sixth period is longer than a length of the fourth period, and the length of the fourth period is longer than a length of the second period.

10. The electro-optical device according to claim 8, wherein
a length of the sixth period is longer than one vertical period from a first time, at which selection potential starts to be supplied to the scan line in the first sub-field, to a second time at which selection potential starts to be supplied to the scan line in a next sub-field subsequent to the first sub-field.

11. The electro-optical device according to claim 10, wherein
the one vertical period is longer than a length of the fourth period.

12. An electronic apparatus comprising the electro-optical device according to claim 8.

* * * * *